(12) United States Patent
Jung et al.

(10) Patent No.: US 9,626,503 B2
(45) Date of Patent: Apr. 18, 2017

(54) METHODS AND SYSTEMS FOR MANAGING SERVICES AND DEVICE DATA

(71) Applicants: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/731,641

(22) Filed: Dec. 31, 2012

(65) Prior Publication Data

US 2014/0123298 A1    May 1, 2014

Related U.S. Application Data

(63) Continuation-in-part of application No. 13/685,485, filed on Nov. 26, 2012, and a continuation-in-part of
(Continued)

(51) Int. Cl.
*G06F 21/44* (2013.01)

(52) U.S. Cl.
CPC .................................... *G06F 21/44* (2013.01)

(58) Field of Classification Search
USPC ........................................................ 726/26
See application file for complete search history.

(56) References Cited

U.S. PATENT DOCUMENTS 6,029,175 A    2/2000    Chow et al.
6,122,520 A    9/2000    Want et al.
(Continued)

FOREIGN PATENT DOCUMENTS

EP    1818807 A    8/2007
WO    WO 01/28273 A1 *  4/2001 ............... H04Q 7/38

OTHER PUBLICATIONS

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.
(Continued)

*Primary Examiner* — Beemnet Dada

(57) ABSTRACT

Computationally implemented methods and systems include acquiring property data regarding at least one property of one or more devices, generating anonymized data by altering the acquired property data to obscure one or more portions of the acquired property data that uniquely identify the one or more devices and/or one or more users of the one or more devices, presenting the anonymized data to one or more service providers configured to generate one or more services, and acquiring the generated one or more services, said generated one or more services at least partly based on the anonymized data. In addition to the foregoing, other aspects are described in the claims, drawings, and text.

39 Claims, 33 Drawing Sheets

Related U.S. Application Data application No. 13/685,609, filed on Nov. 26, 2012, and a continuation-in-part of application No. 13/685,488, filed on Nov. 26, 2012, and a continuation-in-part of application No. 13/685,612, filed on Nov. 26, 2012, and a continuation-in-part of application No. 13/685,491, filed on Nov. 26, 2012, and a continuation-in-part of application No. 13/685,613, filed on Nov. 26, 2012, and a continuation-in-part of application No. 13/692,829, filed on Dec. 3, 2012, and a continuation-in-part of application No. 13/692,882, filed on Dec. 3, 2012.

(56) References Cited

U.S. PATENT DOCUMENTS

| | | |
|---|---|---|
| 6,871,277 B1 | 3/2005 | Keronen |
| 7,178,034 B2 | 2/2007 | Cihula et al. |
| 7,203,752 B2 | 4/2007 | Rice et al. |
| 7,269,853 B1 | 9/2007 | Dunn |
| 7,496,652 B2 | 2/2009 | Pezzutti |
| 7,647,164 B2 | 1/2010 | Reeves |
| 7,685,238 B2 | 3/2010 | Etelapera |
| 7,849,311 B2 | 12/2010 | Donlin et al. |
| 7,860,807 B2 | 12/2010 | Kaneko et al. |
| 7,873,957 B2 | 1/2011 | Nallipogu et al. |
| 7,913,312 B2 | 3/2011 | de Jong |
| 7,917,154 B2 | 3/2011 | Fortescue et al. |
| 7,996,682 B2 | 8/2011 | Schutz et al. |
| 8,364,389 B2 | 1/2013 | Dorogusker et al. |
| 8,387,155 B2 | 2/2013 | Gregg et al. |
| 8,504,729 B2 | 8/2013 | Pezzutti |
| 8,578,483 B2 | 11/2013 | Seshadri et al. |
| 8,630,494 B1 | 1/2014 | Svendsen |
| 8,756,321 B2 | 6/2014 | Clark et al. |
| 9,047,648 B1 | 6/2015 | Lekutai et al. |
| 2001/0025316 A1 | 9/2001 | Oh |
| 2002/0032798 A1 | 3/2002 | Xu |
| 2003/0023726 A1 | 1/2003 | Rice et al. |
| 2003/0045308 A1 | 3/2003 | Sidhu et al. |
| 2003/0191877 A1 | 10/2003 | Zaudtke et al. |
| 2004/0002902 A1 | 1/2004 | Muehlhaeuser |
| 2004/0128500 A1 | 7/2004 | Cihula et al. |
| 2004/0230835 A1 | 11/2004 | Goldfeder et al. |
| 2005/0278342 A1 | 12/2005 | Abdo et al. |
| 2006/0010047 A1 | 1/2006 | Minor |
| 2007/0006321 A1 | 1/2007 | Bantz et al. |
| 2007/0044143 A1 | 2/2007 | Zhu et al. |
| 2007/0113079 A1 | 5/2007 | Ito et al. |
| 2007/0136466 A1 | 6/2007 | Etelapera |
| 2007/0142727 A1 | 6/2007 | Zhang et al. |
| 2007/0232268 A1 | 10/2007 | Park et al. |
| 2007/0273583 A1 | 11/2007 | Rosenberg |
| 2008/0046886 A1 | 2/2008 | Brown et al. |
| 2008/0102856 A1 | 5/2008 | Fortescue et al. |
| 2008/0126541 A1 | 5/2008 | Rosenberg et al. |
| 2008/0153670 A1 | 6/2008 | McKirdy et al. |
| 2008/0189793 A1 | 8/2008 | Kirkup et al. |
| 2008/0207232 A1 | 8/2008 | Rice et al. |
| 2008/0229389 A1 | 9/2008 | Singh et al. |
| 2009/0077085 A1 | 3/2009 | Olivieri et al. |
| 2010/0024020 A1 | 1/2010 | Baugher et al. |
| 2010/0070475 A1 | 3/2010 | Chen |
| 2010/0082237 A1 | 4/2010 | Black |
| 2010/0107225 A1 | 4/2010 | Spencer et al. |
| 2010/0324819 A1 | 12/2010 | Nurminen et al. |
| 2011/0022468 A1 | 1/2011 | Muster et al. |
| 2011/0128568 A1 | 6/2011 | Bhogal et al. |
| 2011/0136472 A1 | 6/2011 | Rector et al. |
| 2011/0179366 A1 | 7/2011 | Chae |
| 2011/0190009 A1 | 8/2011 | Gerber, Jr. et al. |
| 2011/0209221 A1 | 8/2011 | Hanson et al. |
| 2011/0243553 A1 | 10/2011 | Russell |
| 2011/0274011 A1 | 11/2011 | Stuempert et al. |
| 2011/0295899 A1 | 12/2011 | James et al. |
| 2012/0036345 A1 | 2/2012 | Chen et al. |
| 2012/0054841 A1 | 3/2012 | Schultz et al. |
| 2012/0084247 A1 | 4/2012 | Aguera y Arcas et al. |
| 2012/0089465 A1 | 4/2012 | Froloff |
| 2012/0096080 A1 | 4/2012 | Levesque et al. |
| 2012/0101952 A1 | 4/2012 | Raleigh et al. |
| 2012/0117232 A1 | 5/2012 | Brown et al. |
| 2012/0143662 A1 | 6/2012 | Heath |
| 2012/0185912 A1 | 7/2012 | Lee et al. |
| 2012/0209923 A1 | 8/2012 | Mathur et al. |
| 2012/0222083 A1 | 8/2012 | Vaha-Sipila et al. |
| 2012/0291101 A1 | 11/2012 | Ahlstrom et al. |
| 2012/0317565 A1 | 12/2012 | Carrara et al. |
| 2013/0014212 A1 | 1/2013 | Cohen |
| 2013/0046632 A1 | 2/2013 | Grigg et al. |
| 2013/0110854 A1 | 5/2013 | Lockhart et al. |
| 2013/0124546 A1 | 5/2013 | Wormley et al. |
| 2013/0179244 A1 | 7/2013 | Laffoon et al. |
| 2013/0179988 A1 | 7/2013 | Bekker et al. |
| 2013/0219461 A1 | 8/2013 | Esaki et al. |
| 2013/0232573 A1 | 9/2013 | Saidi et al. |
| 2013/0263000 A1 | 10/2013 | Lucas et al. |
| 2013/0263206 A1 | 10/2013 | Nefedov et al. |
| 2013/0282227 A1 | 10/2013 | Chen et al. |
| 2013/0290359 A1 | 10/2013 | Eronen et al. |
| 2013/0318627 A1 | 11/2013 | Lundkvist et al. |
| 2013/0339234 A1 | 12/2013 | Prakash et al. |
| 2014/0006616 A1 | 1/2014 | Aad et al. |
| 2014/0031959 A1 | 1/2014 | Glode et al. |
| 2014/0047062 A1 | 2/2014 | Krueger et al. |
| 2014/0059695 A1 | 2/2014 | Parecki et al. |
| 2014/0074570 A1 | 3/2014 | Hope et al. |
| 2014/0122890 A1 | 5/2014 | Prot |
| 2014/0123300 A1 | 5/2014 | Jung et al. |
| 2014/0195349 A1 | 7/2014 | Muster et al. |
| 2015/0222641 A1 | 8/2015 | Lu et al. |

OTHER PUBLICATIONS

PCT International Search Report; International App. No. PCT/US14/19562; Jun. 10, 2014; pp. 1-2.
Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.
Extended European Search Report; European App. No. EP 14 75 7393; Oct. 13, 2016; pp. 1-8.
Holder, Joseph; "BlackBerry 101—Application permissions"; bearing a date of Dec. 31, 2010; printed on Sep. 28, 2016; pp. 1-6.
Beresford et al.; "MockDroid: trading privacy for application functionality on smartphones"; HotMobile; Mar. 1-3, 2011; pp. 49-54.
"Tasker: Total Automation for Android"; Internet Archive—Wayback Machine; Archived on Jul. 5, 2012; 14 total pages.

* cited by examiner

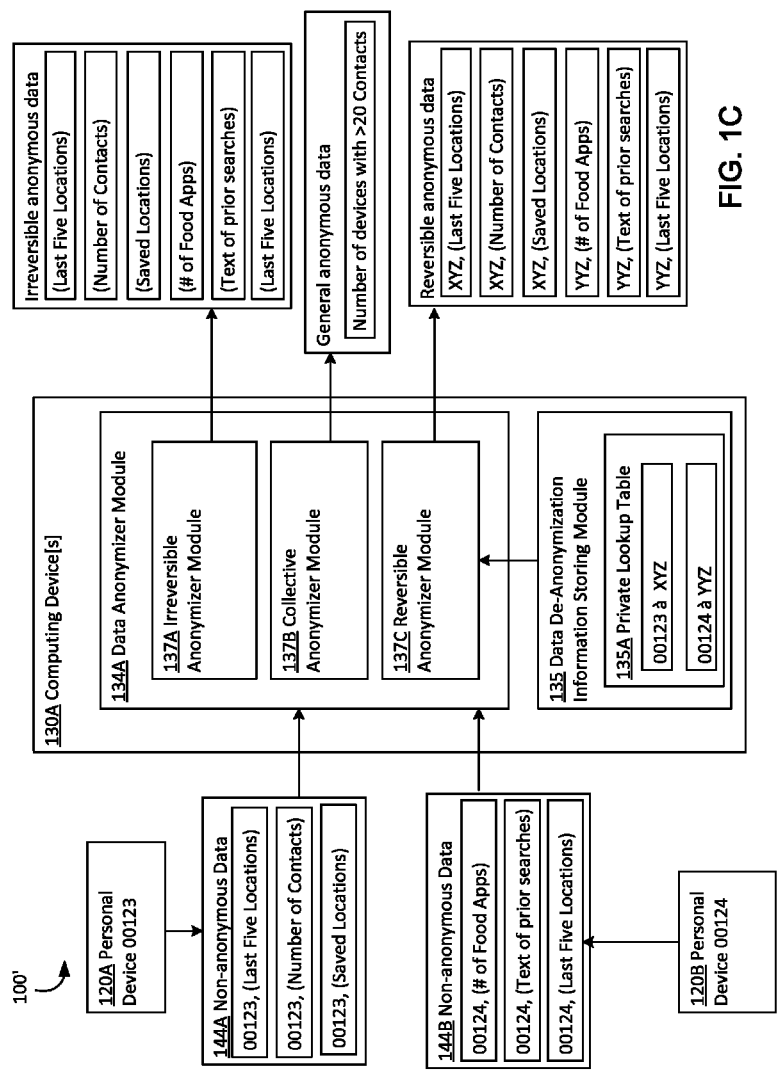

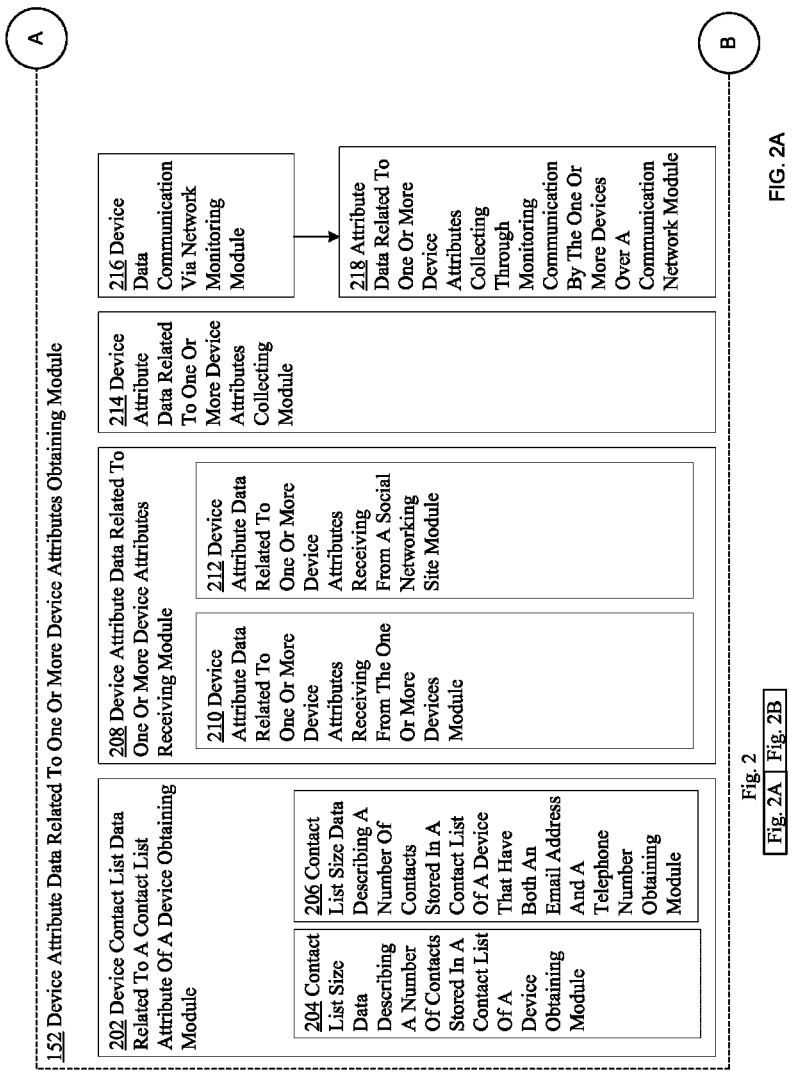

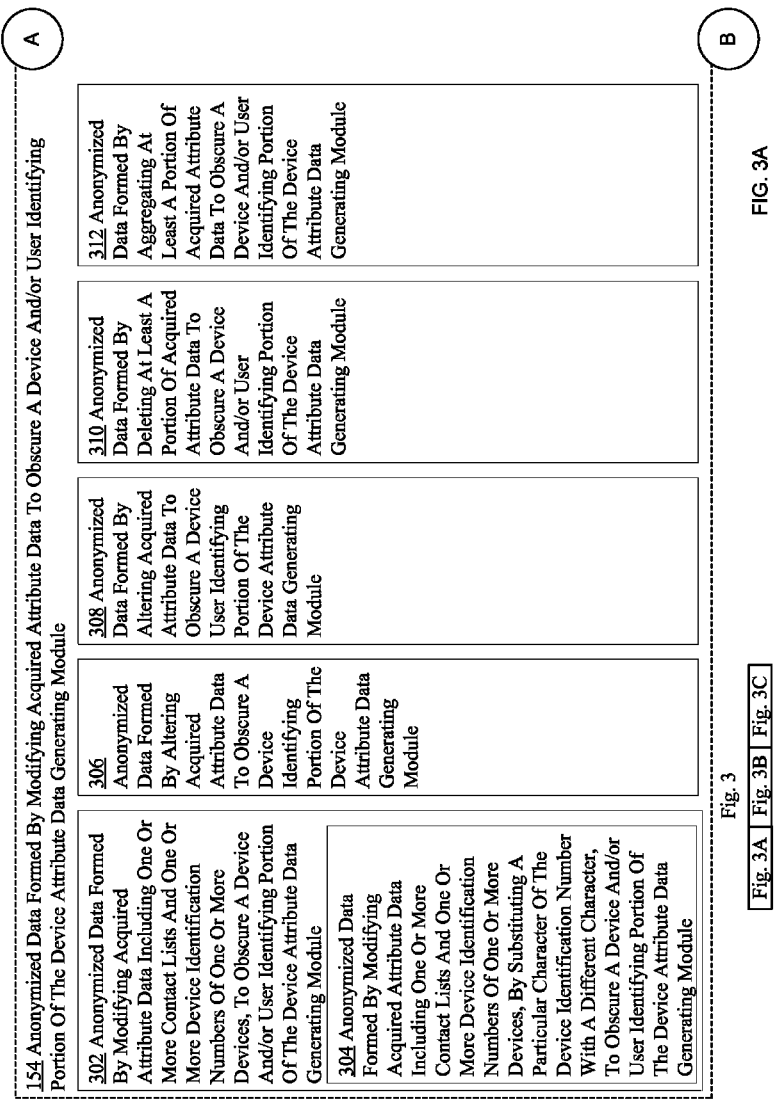

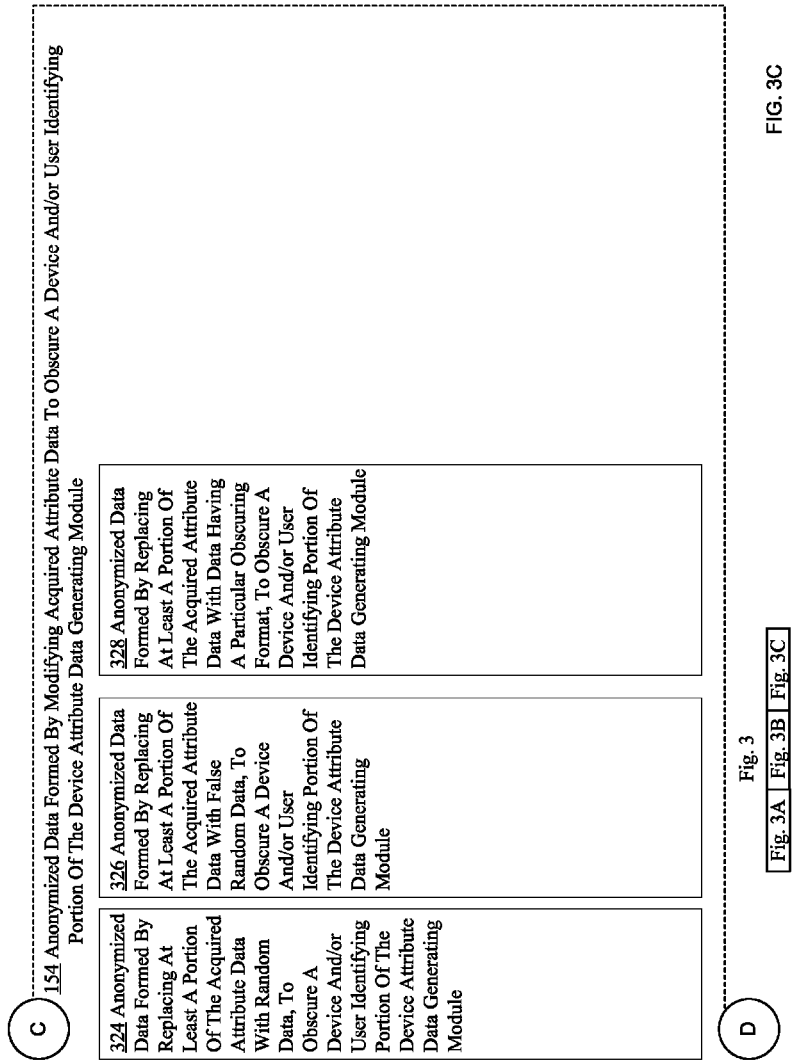

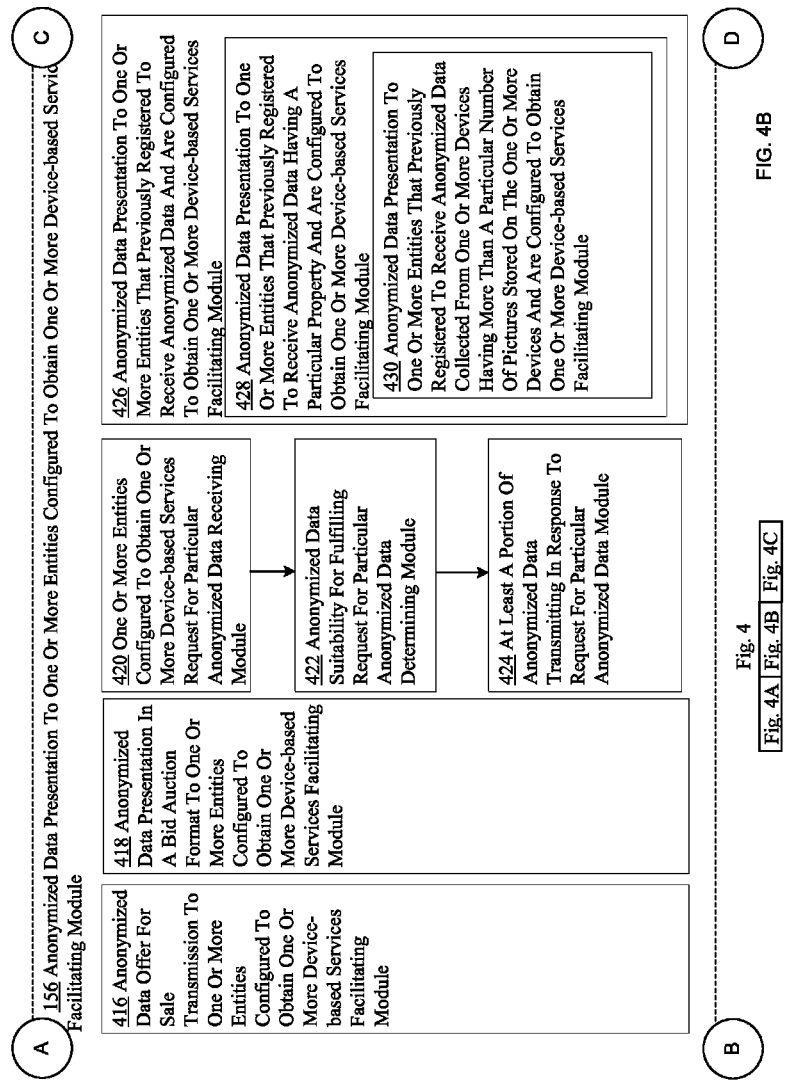

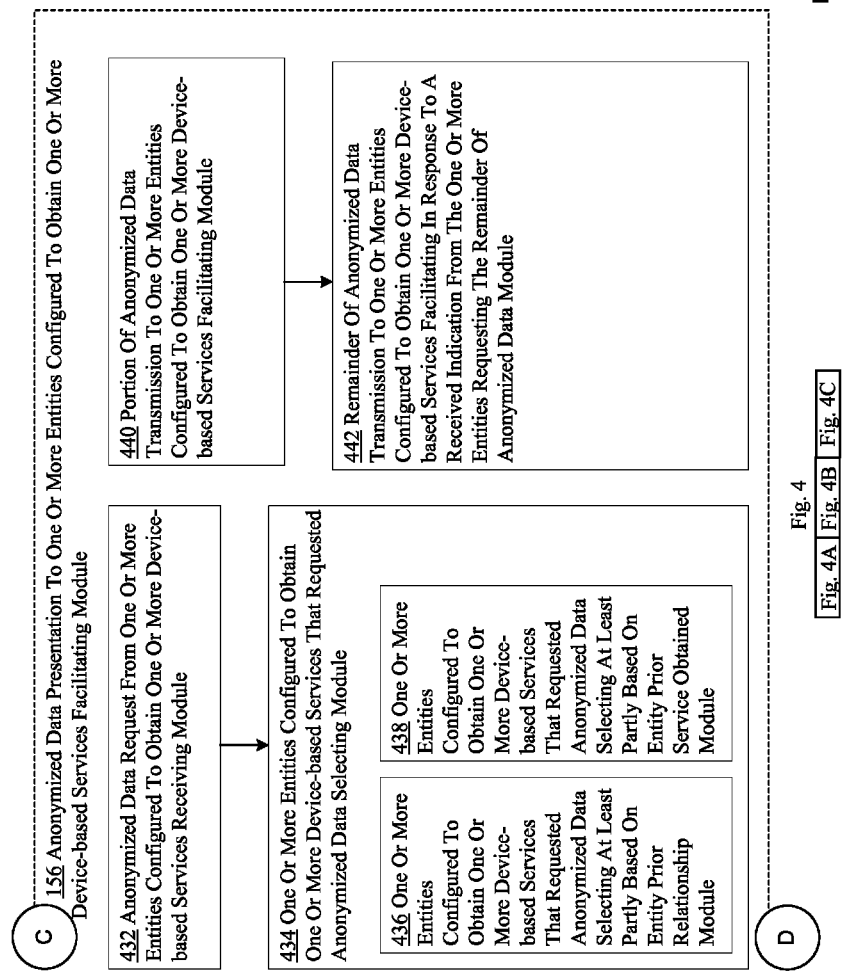

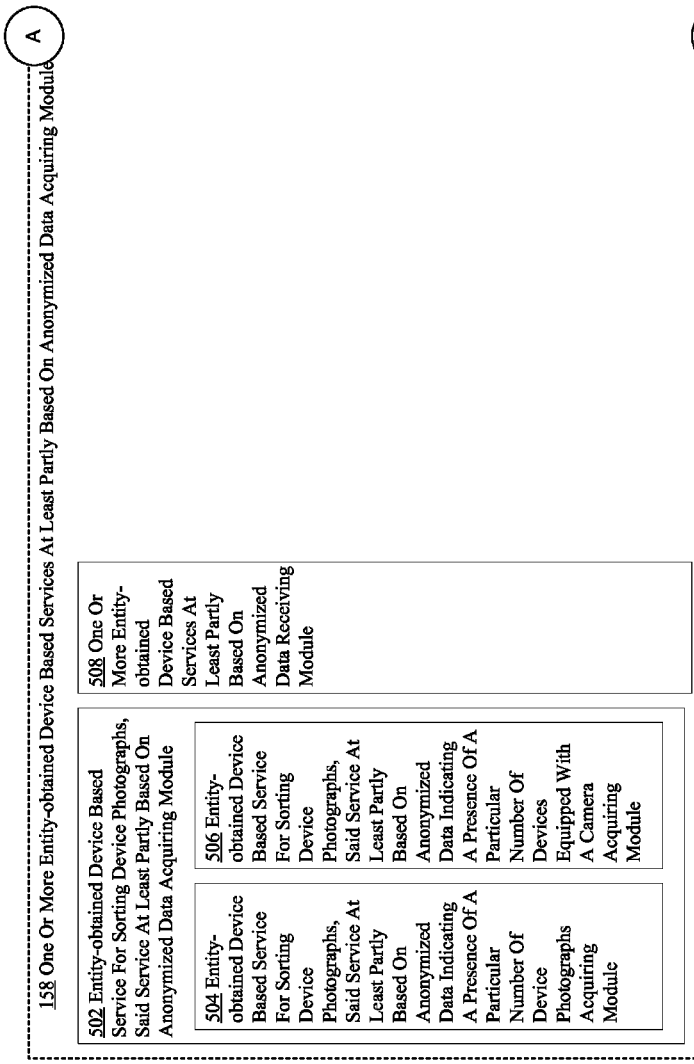

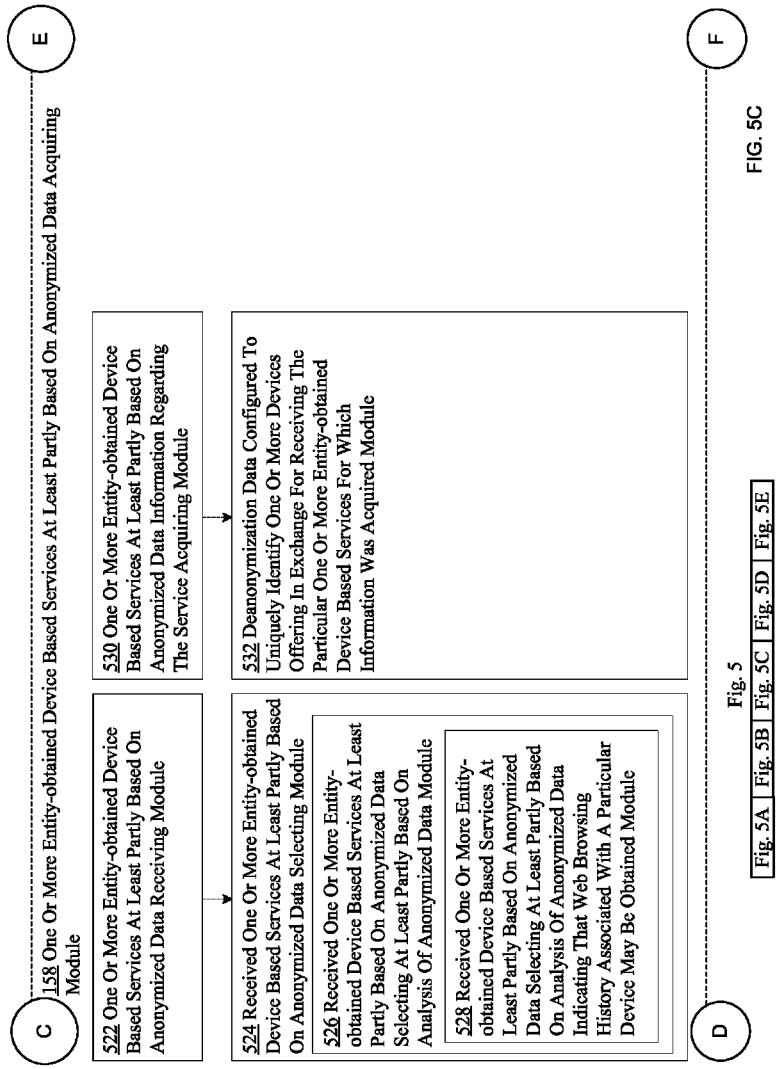

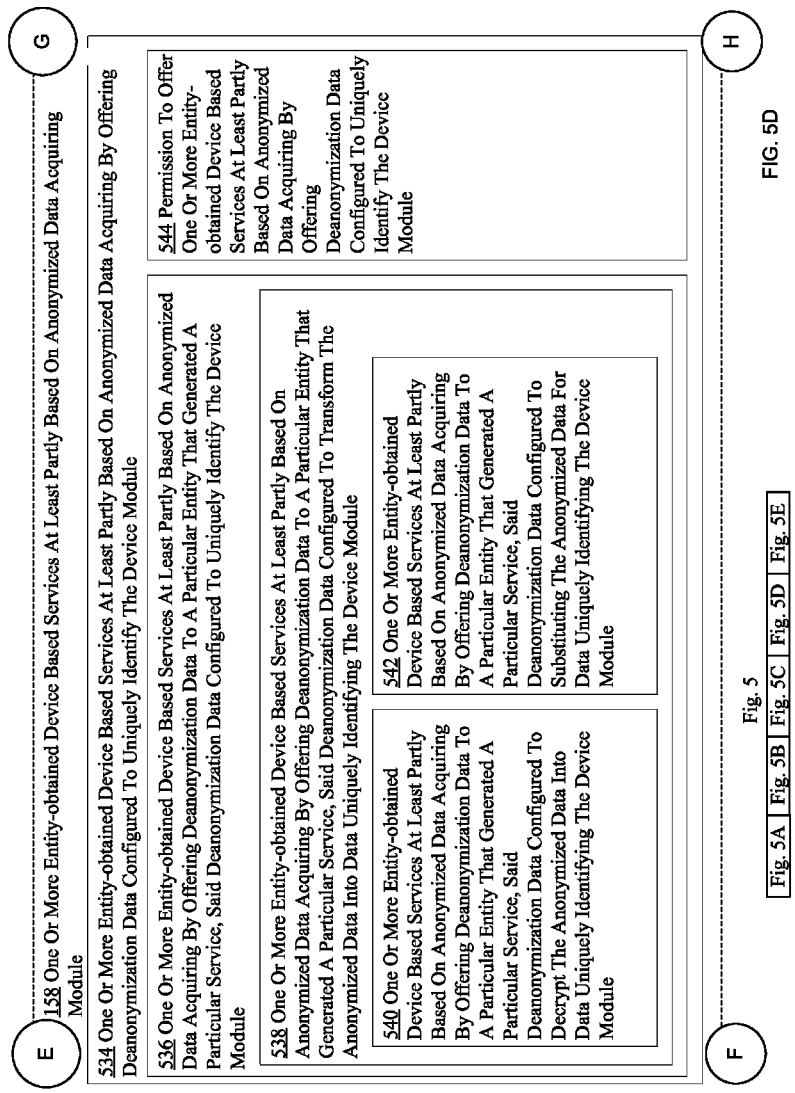

METHODS AND SYSTEMS FOR MANAGING SERVICES AND DEVICE DATA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 61/720,245 titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 61/720,874 titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which was filed within the twelve months preceding the filing date of the present application or is an application of which a currently co-pending application is entitled to the benefit of the filing date.

For purposes of the USPTO extra-statutory requirements, the present application constitutes a continuation-in-part of U.S. patent application Ser. No. 13/685,485, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,609, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,488, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,612, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,491, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,613, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,829, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,882, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

RELATED APPLICATIONS

U.S. patent application Ser. No. 13/731,624, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,947, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,960, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,968, entitled METHODS AND SYSTEMS FOR MANAGING DATA AND/OR SERVICES FOR DEVICES, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,127, entitled METHODS AND SYSTEMS FOR MANAGING DATA AND/OR SERVICES FOR DEVICES, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,305, entitled METHODS AND SYSTEMS FOR MONITORING AND/OR MANAGING DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,326, entitled METHODS AND SYSTEMS FOR MONITORING AND/OR MANAGING DEVICE DATA, naming Edward K. Y. Jung, Royce A. Levien, Richard T. Lord, Robert W. Lord, and Mark A. Malamud as inventors, filed 31 Dec. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services.

SUMMARY

In one or more various aspects, a method includes but is not limited to acquiring property data regarding at least one property of one or more devices, generating anonymized data by altering the acquired property data to obscure one or more portions of the acquired property data that uniquely identify the one or more devices and/or one or more users of the one or more devices, presenting the anonymized data to one or more service providers configured to generate one or more services, and acquiring the generated one or more services, said generated one or more services at least partly based on the anonymized data. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring property data regarding at least one property of one or more devices, means for generating anonymized data by altering the acquired property data to obscure one or more portions of the acquired property data that uniquely identify the one or more devices and/or one or more users of the one or more devices, means for presenting the anonymized data to one or more service providers configured to generate one or more services, and means for acquiring the generated one or more services, said generated one or more services at least partly based on the anonymized data. In addition to the foregoing, other system aspects are described in the claims, drawings, and text forming a part of the disclosure set forth herein.

In one or more various aspects, a system includes, but is not limited to, circuitry for acquiring property data regarding at least one property of one or more devices, circuitry for generating anonymized data by altering the acquired property data to obscure one or more portions of the acquired property data that uniquely identify the one or more devices and/or one or more users of the one or more devices, circuitry for presenting the anonymized data to one or more service providers configured to generate one or more services, and acquiring the generated one or more services, said generated one or more services at least partly based on the anonymized data. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring property data regarding at least one property of one or more devices, one or more instructions for generating anonymized data by altering the acquired property data to obscure one or more portions of the acquired property data that uniquely identify the one or more devices and/or one or more users of the one or more devices, and one or more instructions for presenting the anonymized data to one or more service providers configured to generate one or more services, and one or more instructions for acquiring the generated one or more services, said generated one or more services at least partly based on the anonymized data. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring property data regarding at least one property of one or more devices, one or more interchained physical machines ordered for generating anonymized data by altering the acquired property data to obscure one or more portions of the acquired property data that uniquely identify the one or more devices and/or one or more users of the one or more devices, one or more interchained physical machines ordered for presenting the anonymized data to one or more service providers configured to generate one or more services, and one or more interchained physical machines ordered for acquiring the generated one or more services, said generated one or more services at least partly based on the anonymized data.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1C shows a high level block diagram of a computing device 130A operating in an exemplary embodiment 100', according to an embodiment.

FIG. 2, including FIGS. 2A-2B, shows a particular perspective of an device attribute data related to one or more device attributes obtaining module 152 of processing module 150 of computing device 130 of FIG. 1B, according to an embodiment.

FIG. 3, including FIGS. 3A-3C, shows a particular perspective of a anonymized data formed by modifying acquired attribute data to obscure a device and/or user identifying portion of the device attribute data generating module 154 of processing module 150 of computing device 130 of FIG. 1B, according to an embodiment.

FIG. 4, including FIGS. 4A-4C, shows a particular perspective of an anonymized data presentation to one or more entities configured to obtain one or more device-based services facilitating module 156 of processing module 150 of computing device 130 of FIG. 1B, according to an embodiment.

FIG. 5, including FIGS. 5A-5E, shows a particular perspective of an one or more entity-obtained device based services at least partly based on anonymized data acquiring module 158 of processing module 150 of computing device 130 of FIG. 1B, according to an embodiment.

DETAILED DESCRIPTION

Figure 1A:
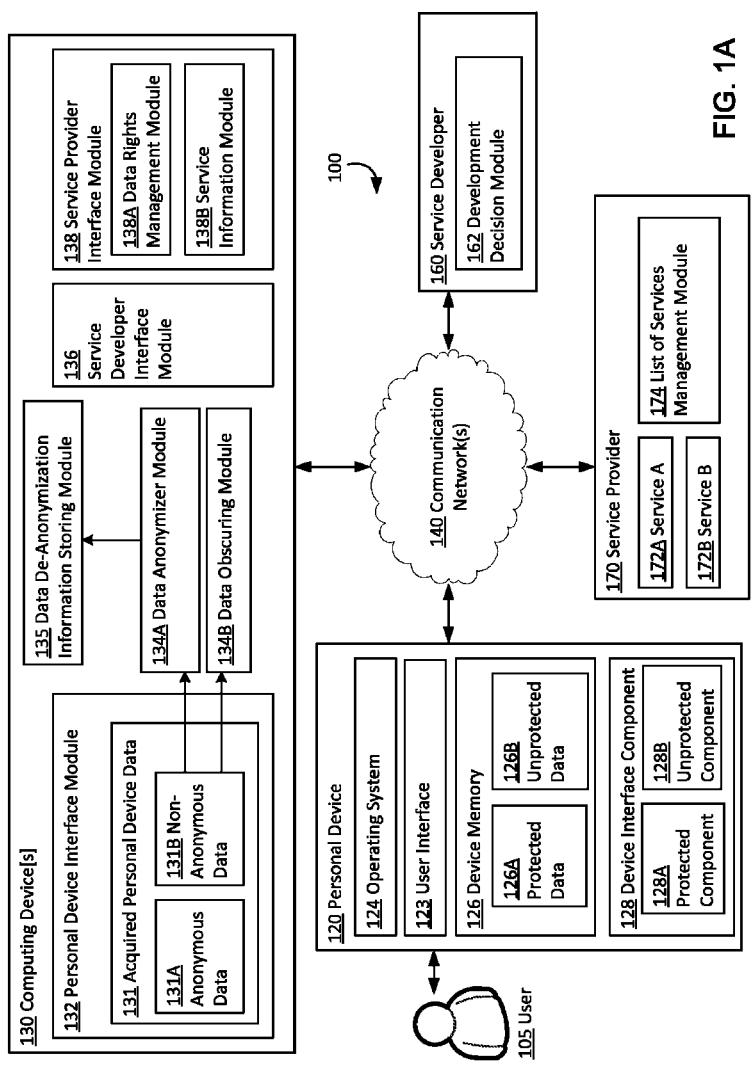
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring property data regarding at least one property of one or more devices, generating anonymized data by altering the acquired property data to obscure one or more portions of the acquired property data that uniquely identify the one or more devices and/or one or more users of the one or more devices, presenting the anonymized data to one or more service providers configured to generate one or more services, and acquiring the generated one or more services, said generated one or more services at least partly based on the anonymized data.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex inter-chaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1, FIG. 1 illustrates an example environment 100 in which the methods, systems, circuitry, articles of manufacture, and computer program products and architecture, in accordance with various embodiments, may be implemented by one or more computing devices 130. As shown in FIG. 1A, one or more personal devices 120, one or more service providers 170, one or more service developers 160, and one or more computing devices 30 may communicate via one or more communication networks 140. In an embodiment, service provider 170 may have one or more services that personal device 120 may want. In an embodiment, computing device 130, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 20. In an embodiment, as described in more detail herein, computing device 130 may have access to some or all of the data on personal device 120. In another embodiment, computing device 130 may have access to only a portion of the data on personal device 120. In still another embodiment, computing device 130 may have access to a modified version of the data on personal device 120. Specifically, in an embodiment, computing device 20 may have access to the data stored on personal device 120, but in anonymous form.

In an embodiment, computing device 130 may offer one or more services to personal device 120. In an embodiment, the offer of one or more services may be conditional on a grant of access to part or all of the data stored and/or collected by personal device 120. In an embodiment, computing device 30 may receive one or more services from service provider 170 and/or service developer 160, and may select one or more of the received services for presentation to the personal device 120. In an embodiment, the data from personal device 120 may be shared with one or more of service provider 170 and service developer 160. In an embodiment, the data from personal device 120 may be anonymized prior to sharing with service developer 160 and/or service developer 170.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 20 may include a user interface 123. User interface 123 may include any hardware, software, firmware, and combination thereof that allow a user 105 to interact with a personal device 120, and for a personal device 120 to interact with a user 105. In some embodiments, user interface 123 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating at the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 is a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 30 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 30 may request data from personal device 120. In some embodiments, computing device 30 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 30 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially or non-uniquely identify its origin, e.g., the user 105 or the personal device 120 from which the anonymous data came. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Referring to FIGS. 1A-1D, data anonymization systems and methods are illustrated. Although these systems and methods are illustrated as part of computing device 130, this is merely for convenience of drawing. In an embodiment, one or more of data de-anonymization information storing module 135, data anonymizer module 134A, and data obscuring module 134B may be located within personal device 120. In an embodiment, these modules may interact directly with device memory 126. In an embodiment, as pictured in FIG. 1A, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Figure 1B:
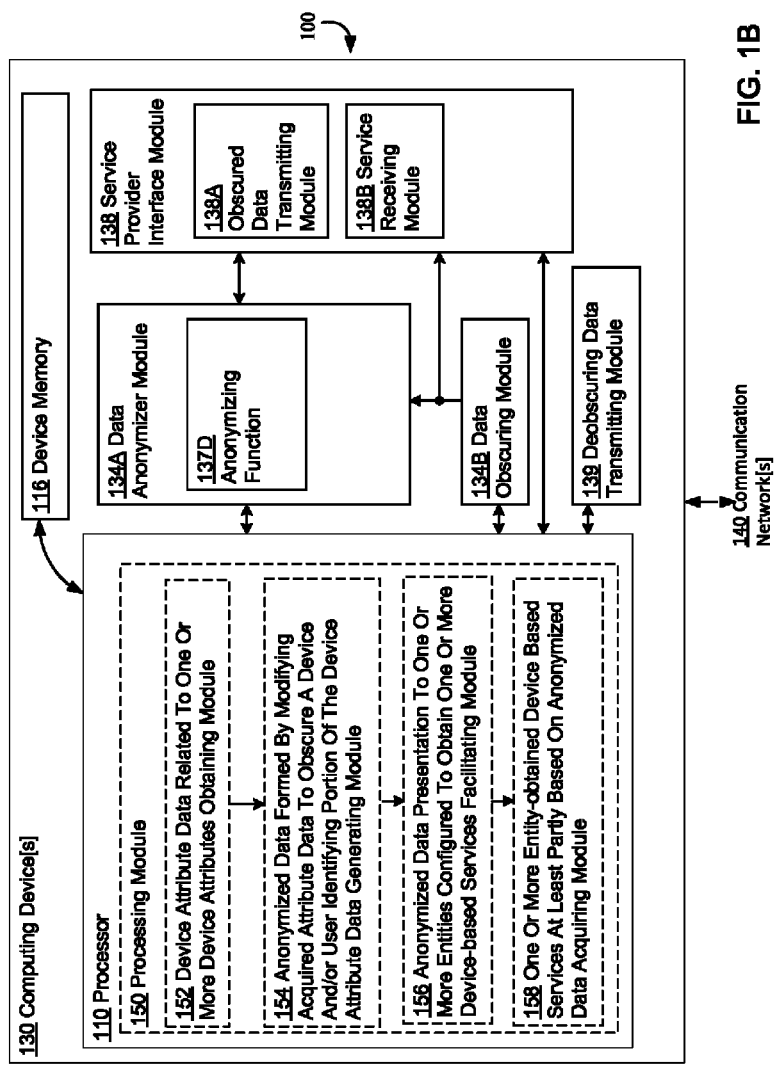
FIG. 1B shows a high-level block diagram of a personal device 120 operating in an exemplary environment 100, according to an embodiment.
Figure 1D:
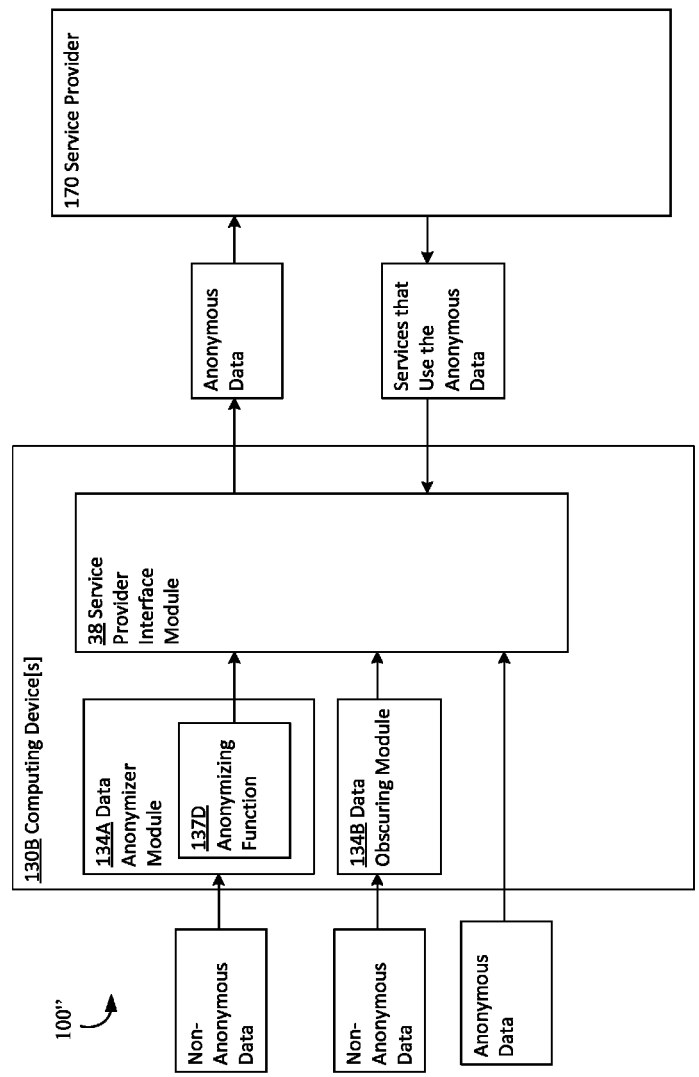
FIG. 1D shows a high-level block diagram of a computing device 130B operating in an exemplary embodiment 100", according to an embodiment.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multidimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the anonymized data may be used by the service provider interface module 38 to give data to the service provider 170, either to carry out a portion of a service, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Figure 1E:
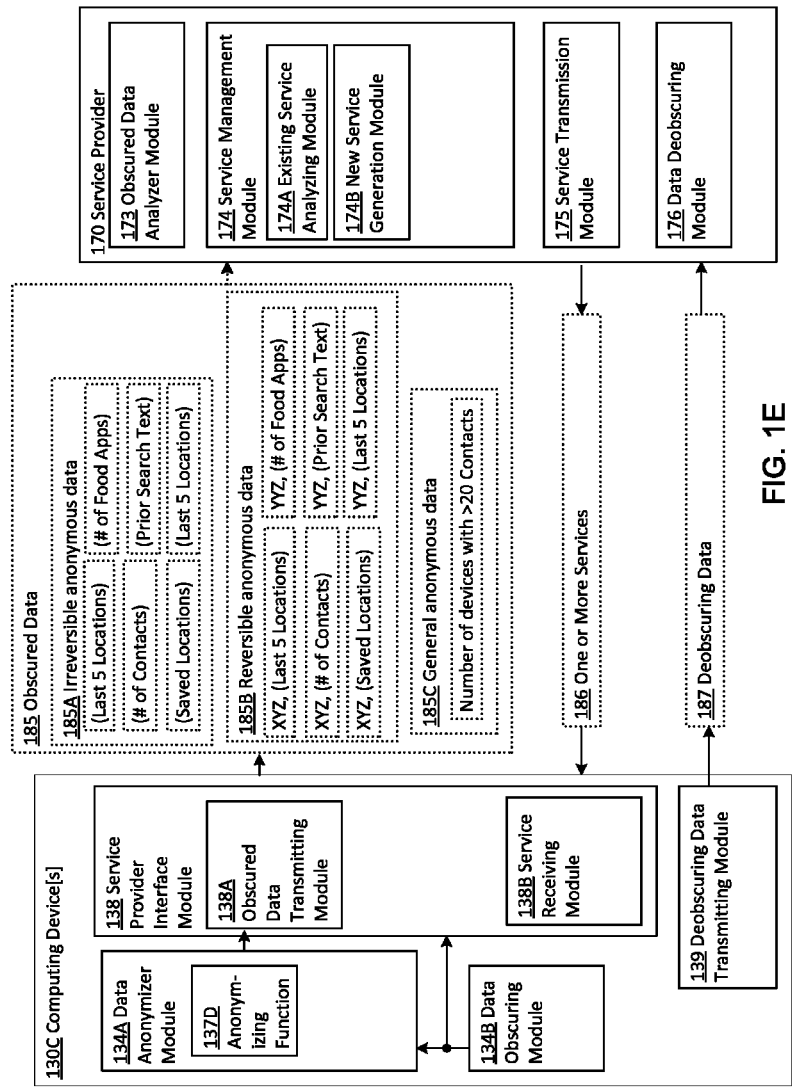
FIG. 1E shows a high-level block diagram of a computing device 130C operating in an exemplary embodiment 100''', according to an embodiment.

Referring now to FIG. 1E, FIG. 1E shows an embodiment of the invention focusing on a service provider 170 and a computing device 130C. Computing device 130C may receive data from one or more devices, and that data may be anonymized already, or may not be anonymized, or may already be obscured. In an embodiment, computing device 130C may generate obscured data from the data received from one or more devices, whether received directly from the one or more devices, or indirectly from another source. In an embodiment, Computing device 130C may obscure received data, even if the received data is already anonymized. In another embodiment, computing device 130C may not perform additional steps on previously anonymized or obscured data.

Referring again to FIG. 1E, in an embodiment, computing device 130C may request one or more services 190 that may be executed on one or more devices. The one or more services may be performed independently by the one or more devices, or may be performed with facilitation of one or more portions of the services by computing device 130C. Computing device 130C may request that service provider 170 provide one or more services that can be presented to the one or more devices. In an embodiment, computing device 130C may transmit obscured data 185 to service provider 170. This transmission may take place via any form of network, e.g., communication network 140 (not pictured in FIG. 1E). In an embodiment, service provider 170 may be integral with computing device 130C. In an embodiment, service provider 170 and computing device 130C may be under the control of a single entity.

Referring again to FIG. 1E, in an embodiment, service provider 170 may receive the obscured data 185. The obscured data 185 may be in any format, as described in several examples herein. The examples illustrated in FIG. 1E and in the following figures are intended for ease of understanding only, and should not be considered an exhaustive or an exclusive enumeration of ways that data may be obscured. For example, in an embodiment, irreversible anonymous data 185A may be obscured by deleting the device origin information from the data, such that the data cannot be recovered using the irreversible anonymous data 185A. In order to obtain the original device information that formed the irreversible anonymous data 185A, a copy of the original data may be retrieved. For example, in an embodiment, computing device 130C may store a separate copy of the data that resulted in the irreversible anonymous data 185A, with uniquely identifying device information present in the copy kept by computing device 130C.

In an embodiment, obscured data 185 may include reversible anonymous data 185B. Data 185B is not limited to a particular type of format, but a simple example is shown. In the example, the device identifiers of the one or more personal devices 120A and 120B, e.g., 00123 and 00124, are converted to new identifiers XYZ and YYZ (e.g., as shown in FIG. 1C), which, in an embodiment, may prevent service provider 170 from learning the identity of devices 00123 and 00124. In an embodiment, reversible anonymous data 185B may be converted into data that uniquely identifies one or more devices, through the providing of one or more algorithms, lookup tables, keys, encryption keys, hash functions, and the like.

In an embodiment, obscured data 185 may include general anonymous data 185C. In an embodiment, this type of data may include any format of aggregated data which gives information about one or more devices, but does not particularly identify the one or more devices that led to the aggregate information. For example, general anonymous data 185C may include such data as "thirty-five devices with more than twenty contacts in a contact list found," or more specific data, such as "thirty-five smartphones, e.g., Apple iPhone 4S running iOS 6.0, with more than 2.0 gigabytes of space remaining, with more than twenty contacts in a contact list found."

Referring again to FIG. 1E, in an embodiment, service provider 170 may receive obscured data 185, as shown in FIG. 1E. In an embodiment, service provider 170 may include an obscured data analyzer module 173. Obscured data analyzer module 173 may receive the obscured data 185 and use the obscured data 185 to determine one or more services or types of services that may be useful to the devices referenced in the obscured data 185. Obscured data analyzer module 173 may be completely automated, or may have some human intervention in the process. In an embodiment, obscured data analyzer 173 may obtain obscured data 185 from several different computing devices 130C, which may allow service provider 170 to provide one or more services more efficiently. In an embodiment, service provider 170 may include service management module 174. Service management module 174 may include existing service analyzing module 174A and new service generation module 174B. Existing service analyzing module 174A and new service generation module 174B may work together or separately, and with or without obscured data analyzer module 173, to determine if a service exists that meets the needs determined based on the received obscured data. If such a service does not exist, then new service generation module 174B may generate a new service, either by requesting from a third party, requesting human intervention, e.g., human programming of a new service, or may generate a new service automatically.

In an embodiment, service provider 170 may include a service transmission module 175, which may transmit one or more services 186 back to the computing device 130C, e.g., to service receiving module 138B, which, in an embodiment, may be a portion of service provider interface module 138. In various embodiments, once one or more actions are taken with respect to receiving the one or more services 186, deobscuring data 187, which may be data that can deobscure the obscured data 185, may be transmitted to the service provider 170, e.g., to data deobscuring module 176 of service provider 170. In an embodiment, deobscuring data 187 is combined with obscured data 185 to result in deobscured data. In another embodiment, deobscuring data 187 does not need to be combined with obscured data 185 in order to result in the deobscured data. In an embodiment, deobscuring data 187 may be transmitted upon receipt of one or more services 186. In another embodiment, one or more actions related to one or more services 186, e.g., proposing the one or more services to one or more devices, may be carried out prior to transmitting the deobscuring data 187. In an embodiment, if a particular number of users do not use one or more services 186, then computing device 130C may not transfer deobscuring data 187.

Figure 1F:
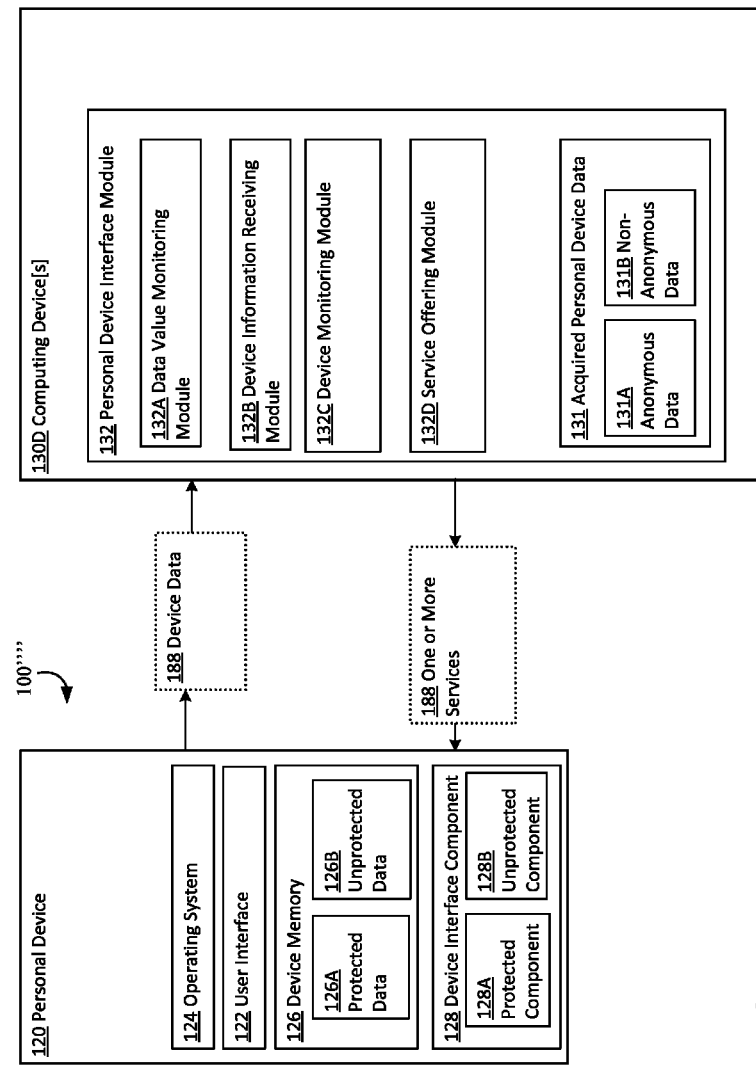
FIG. 1F shows a high-level block diagram of a computing device 130D operating in an exemplary embodiment 100"", according to an embodiment.

Referring now to FIG. 1F, FIG. 1F shows an embodiment of the invention as shown in exemplary embodiment 100"". For example, FIG. 1F shows computing device 130D interacting with personal device 120. In an embodiment, computing device 130D receives device data 188 from personal device 120. Although FIG. 1F shows this transfer as coming directly from personal device 120, in an embodiment, computing device 130D may receive device data 188 from any source, including a third device, a communication network, a social networking site, a device manufacturer, and the like. In an embodiment, computing device 130D monitors one or more personal devices 120 for device data 188. In an embodiment, computing device 130D monitors one or more other sources for device data 188 regarding personal devices 120.

In an embodiment, device data 188 may include data that personal device 120 has collected. In an embodiment, the device data 188 may be modified to obscure an identity of the device 120 or a user of the device 120. In an embodiment, the device data 188 is not obscured. In an embodiment, device data 188 may be about data that is stored on device 120 or otherwise under the control of personal device 120, rather than being the actual data under the control of personal device 120. For example, as shown in FIG. 1F, personal device 120 may include protected data 126A, which, in an embodiment, may include the last thirty locations visited by personal device 120. In an embodiment, device data 188 may include the last thirty locations visited by personal device 120. In another embodiment, device data 188 may include an indication that personal device 120 has thirty device locations stored in its memory. In an embodiment, device data 188 may include an indication that personal device 120 has thirty device locations stored in its memory, and 20 of those locations are locations for which an interest has been expressed by an entity in communication with computing device 130D.

Referring again to FIG. 1F, in an embodiment, computing device 130D may include personal device interface module 132. Personal device interface module 132 may include data value monitoring module 132A. In an embodiment, data value monitoring module 132A may receive information regarding which types of data are valuable (e.g., location data, or location data indicating that a device is inside Times Square on New Years' Eve, and the like), and may monitor one or more devices and other locations for one or more indications that a personal device 120 has data estimated to be valuable, and whether that data is protected. In an embodiment, personal device interface module may include device information receiving module 132B configured to receive device data 188. Device data 188 may have any number of formats, as described above, and as shown by way of non-limiting example in the examples given further herein.

Referring again to FIG. 1F, in an embodiment, computing device 130D may include device monitoring module 132C. In an embodiment, device monitoring module 132C may monitor one or more personal devices 120 through any monitoring technique. In an embodiment, device monitoring module 132C may include software, hardware, or firmware associated with personal device 120, that may be configured to report back to device monitoring module 132C at particular intervals. In an embodiment, device monitoring module 132C may monitor personal device 120 through one or more communication networks 140 (not pictured), and may communicate directly with personal device 120. In an embodiment, device monitoring module 132C may monitor personal device 120 through indirect means, e.g., through other devices or systems that may be used by personal device 120.

Referring again to FIG. 1F, in an embodiment, personal device interface module 132 may include service offering module 132D. For example, as described previously, computing device 130D may acquire one or more services. These services may be presented to personal device 120, either for presentation to a user, or for an automated decision regarding whether to accept the services. In an embodiment, the one or more services 188 may require access to protected data, e.g., protected data 126A of the personal device 120, or one or more protected components, e.g., protected component 128A of personal device 120, or both. In an embodiment, computing device 130D may facilitate the presentation of the one or more services to a user 105 of the personal device 120, via the personal device 120.

Referring again to FIG. 1B, FIG. 1B shows a more detailed description of computing device 130. In an embodiment, computing device 130 may include a processor 110. Processor 110 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 110 may be a server. In some embodiments, processor 110 may be a distributed-core processor. Although processor 110 is as a single processor that is part of a single computing device 130, processor 110 may be multiple processors distributed over one or many computing devices 130, which may or may not be configured to operate together. Processor 110 is illustrated as being configured to execute computer readable instructions in order to execute one or more operations described above, and as illustrated in FIGS. 6, 7A-7B, 8A-8C, 9A-9C, and 10A-10E. In some embodiments, processor 122 is designed to be configured to operate as processing module 150, which may include one or more of device attribute data related to one or more device attributes obtaining module 152, anonymized data formed by modifying acquired attribute data to obscure a device and/or user identifying portion of the device attribute data generating module 154 anonymized data presentation to one or more entities configured to obtain one or more device-based services facilitating module 156, and one or more entity-obtained device based services at least partly based on anonymized data acquiring module 158.

In an embodiment, computing device 130 may include a device memory 116. In some embodiments, memory 116 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 116 may be located at a single network site. In some embodiments, memory 116 may be located at multiple network sites, including sites that are distant from each other.

Referring now to FIG. 2, FIG. 2 illustrates an exemplary implementation of the device attribute data related to one or more device attributes obtaining module 152. As illustrated in FIG. 2, the device attribute data related to one or more device attributes obtaining module may include one or more sub-logic modules in various alternative implementations and embodiments. For example, as shown in FIG. 2, e.g., FIG. 2A, in some embodiments, module 152 may include one or more of device contact list data related to a contact list attribute of a device obtaining module 202, device attribute data related to one or more device attributes receiving module 208, device attribute data related to one or more device attributes collecting module 214, device data communication via network monitoring module 216, and attribute data related to one or more device attributes collecting through monitoring communication by the one or more devices over a communication network module 218. In some embodiments, module 202 may include one or more of contact list size data describing a number of contacts stored in a contact list of a device obtaining module 204 and contact list size data describing a number of contacts stored in a contact list of a device that have both an email address and a telephone number obtaining module 206. In some embodiments, module 208 may include one or more of device attribute data related to one or more device attributes receiving from the one or more devices module 210 and device attribute data related to one or more device attributes receiving from a social networking site module 212.

Figure 2B:
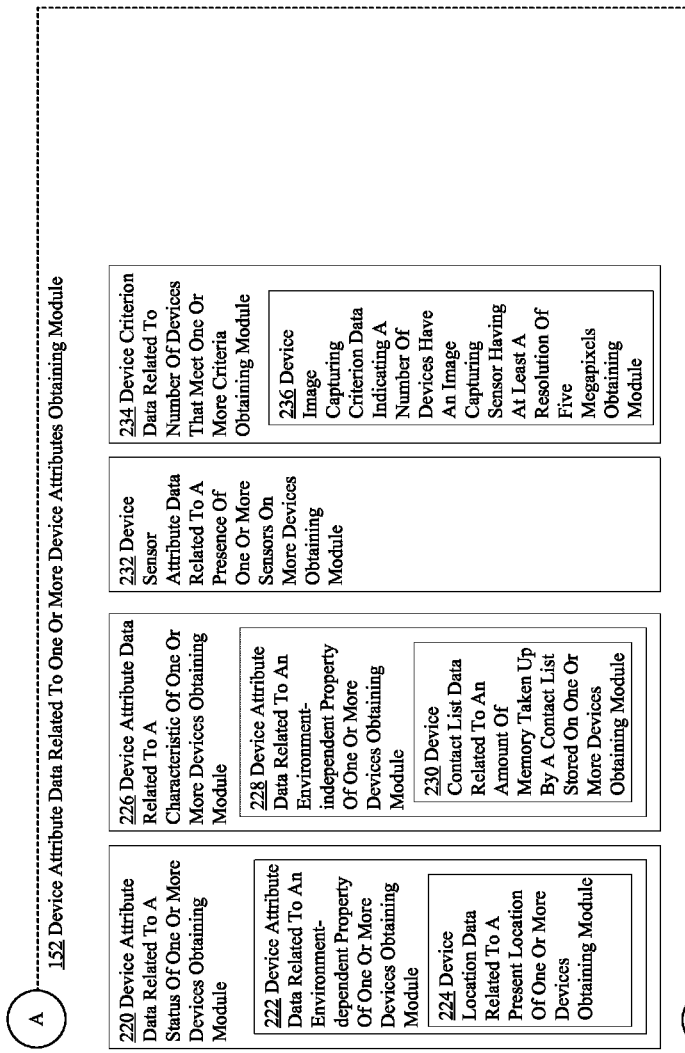

Referring again to FIG. 2, e.g., FIG. 2B, in some embodiments, module 152 may include one or more of device attribute data related to a status of one or more devices obtaining module 220, device attribute data related to a characteristic of one or more devices obtaining module 226, device sensor attribute data related to a presence of one or more sensors on more devices obtaining module 232, and device criterion data related to number of devices that meet one or more criteria obtaining module 234. In some embodiments, module 220 may include device attribute data related to an environment-dependent property of one or more devices obtaining module 222. In some embodiments, module 222 may include device location data related to a present location of one or more devices obtaining module 224. In some embodiments, module 226 may include device attribute data related to an environment-independent property of one or more devices obtaining module 228. In some embodiments, module 228 may include device contact list data related to an amount of memory taken up by a contact list stored on one or more devices obtaining module 230. In some embodiments, module 234 may include device image capturing criterion data indicating a number of devices have an image capturing sensor having at least a resolution of five megapixels obtaining module 236.

Referring now to FIG. 3, FIG. 3 illustrates an exemplary implementation of anonymized data formed by modifying acquired attribute data to obscure a device and/or user identifying portion of the device attribute data generating module 154. As illustrated in FIG. 3, the anonymized data formed by modifying acquired attribute data to obscure a device and/or user identifying portion of the device attribute data generating module 154 may include one or more sub-logic modules in various alternative implementations and embodiments. For example, as shown in FIG. 3 (e.g., FIG. 3A), in some embodiments, module 154 may include one or more of anonymized data formed by modifying acquired attribute data including one or more contact lists and one or more device identification numbers of one or more devices, to obscure a device and/or user identifying portion of the device attribute data generating module 302 (e.g., which, in some embodiments, may include anonymized data formed by modifying acquired attribute data including one or more contact lists and one or more device identification numbers of one or more devices, by substituting a particular character of the device identification number with a different character, to obscure a device and/or user identifying portion of the device attribute data generating module 304), anonymized data formed by altering acquired attribute data to obscure a device identifying portion of the device attribute data generating module 306, anonymized data formed by altering acquired attribute data to obscure a device user identifying portion of the device attribute data generating module 308, anonymized data formed by deleting at least a portion of acquired attribute data to obscure a device and/or user identifying portion of the device attribute data generating module 310, and anonymized data formed by aggregating at least a portion of acquired attribute data to obscure a device and/or user identifying portion of the device attribute data generating module 312.

Figure 3B:
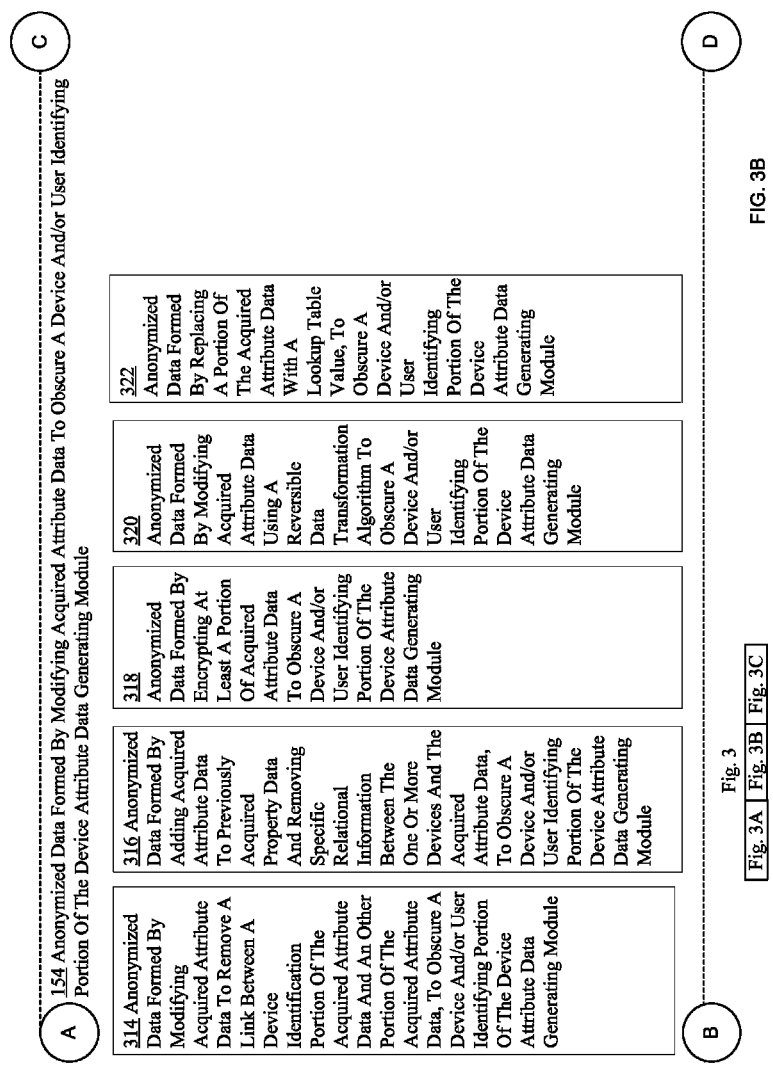

Referring again to FIG. 3, e.g., FIG. 3B, as described above, in some embodiments, module 154 may include module 308. In some embodiments, module 308 may include one or more of anonymized data formed by modifying acquired attribute data to remove a link between a device identification portion of the acquired attribute data and an other portion of the acquired attribute data, to obscure a device and/or user identifying portion of the device attribute data generating module 314, anonymized data formed by adding acquired attribute data to previously acquired property data and removing specific relational information between the one or more devices and the acquired attribute data, to obscure a device and/or user identifying portion of the device attribute data generating module 316, anonymized data formed by encrypting at least a portion of acquired attribute data to obscure a device and/or user identifying portion of the device attribute data generating module 318, anonymized data formed by modifying acquired attribute data using a reversible data transformation algorithm to obscure a device and/or user identifying portion of the device attribute data generating module 320, and anonymized data formed by replacing a portion of the acquired attribute data with a lookup table value, to obscure a device and/or user identifying portion of the device attribute data generating module 322.

Referring again to FIG. 3, e.g., FIG. 3C, in some embodiments, module 154 may include one or more of anonymized data formed by replacing at least a portion of the acquired attribute data with random data, to obscure a device and/or user identifying portion of the device attribute data generating module 324, anonymized data formed by replacing at least a portion of the acquired attribute data with false random data, to obscure a device and/or user identifying portion of the device attribute data generating module 326, and anonymized data formed by replacing at least a portion of the acquired attribute data with data having a particular obscuring format, to obscure a device and/or user identifying portion of the device attribute data generating module 328.

Figure 4A:
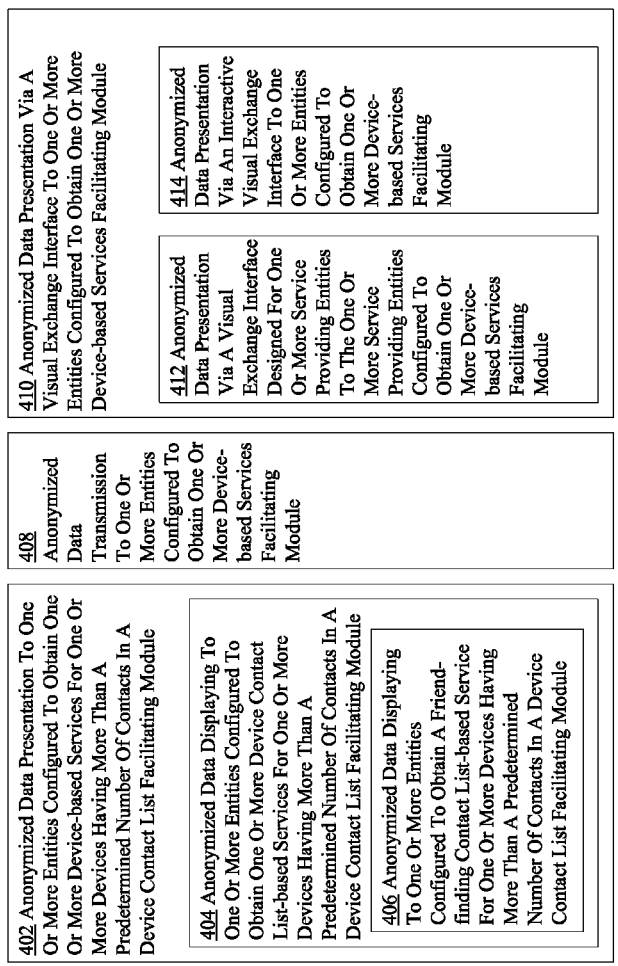

Referring now to FIG. 4, FIG. 4 illustrates an exemplary implementation of anonymized data presentation to one or more entities configured to obtain one or more device-based services facilitating module 156. As illustrated in FIG. 4, the anonymized data presentation to one or more entities configured to obtain one or more device-based services facilitating module 156 may include one or more sub-logic modules in various alternative implementations and embodiments. For example, as shown in FIG. 4, e.g., FIG. 4A, in some embodiments, module 156 may include one or more of anonymized data presentation to one or more entities configured to obtain one or more device-based services for one or more devices having more than a predetermined number of contacts in a device contact list facilitating module 402, anonymized data transmission to one or more entities configured to obtain one or more device-based services facilitating module 408, and anonymized data presentation via a visual exchange interface to one or more entities configured to obtain one or more device-based services facilitating module 410. In some embodiments, module 402 may include anonymized data displaying to one or more entities configured to obtain one or more device contact list-based services for one or more devices having more than a predetermined number of contacts in a device contact list facilitating module 404. In some embodiments, module 404 may include anonymized data displaying to one or more entities configured to obtain a friend-finding contact list-based service for one or more devices having more than a predetermined number of contacts in a device contact list facilitating module 406. In some embodiments, module 410 may include one or more of anonymized data presentation via a visual exchange interface designed for one or more service providing entities to the one or more service providing entities configured to obtain one or more device-based services facilitating module and anonymized data presentation via an interactive visual exchange interface to one or more entities configured to obtain one or more device-based services facilitating module 414.

Referring again to FIG. 4, e.g., FIG. 4B, in some embodiments, module 156 may include one or more of anonymized data offer for sale transmission to one or more entities configured to obtain one or more device-based services facilitating module 416, anonymized data presentation in a bid auction format to one or more entities configured to obtain one or more device-based services facilitating module 418, one or more entities configured to obtain one or more device-based services request for particular anonymized data receiving module 420, anonymized data suitability for fulfilling request for particular anonymized data determining module 422, at least a portion of anonymized data transmitting in response to request for particular anonymized data module 424, and anonymized data presentation to one or more entities that previously registered to receive anonymized data and are configured to obtain one or more device-based services facilitating module 426. In some embodiments, module 426 may include anonymized data presentation to one or more entities that previously registered to receive anonymized data having a particular property and are configured to obtain one or more device-based services facilitating module 428. In some embodiments, module 428 may include anonymized data presentation to one or more entities that previously registered to receive anonymized data collected from one or more devices having more than a particular number of pictures stored on the one or more devices and are configured to obtain one or more device-based services facilitating module 430.

Referring again to FIG. 4, e.g., FIG. 4C, in some embodiments, module 156 may include one or more of anonymized data request from one or more entities configured to obtain one or more device-based services receiving module 432, one or more entities configured to obtain one or more device-based services that requested anonymized data selecting module 434 (e.g., which, in some embodiments, may include one or more of one or more entities configured to obtain one or more device-based services that requested anonymized data selecting at least partly based on entity prior relationship module 436 and one or more entities configured to obtain one or more device-based services that requested anonymized data selecting at least partly based on entity prior service obtained module 438), portion of anonymized data transmission to one or more entities configured to obtain one or more device-based services facilitating module 440, and remainder of anonymized data transmission to one or more entities configured to obtain one or more device-based services facilitating in response to a received indication from the one or more entities requesting the remainder of anonymized data module 442.

Referring now to FIG. 5, FIG. 5 illustrates an exemplary implementation of anonymized data formed by modifying acquired attribute data to obscure a device and/or user identifying portion of the device attribute data generating module 158. As illustrated in FIG. 5. e.g., FIG. 5A, the anonymized data formed by modifying acquired attribute data to obscure a device and/or user identifying portion of the device attribute data generating module 158 may include one or more sub-logic modules in various alternative implementations and embodiments. For example, in some embodiments, module 158 may include one or more of entity-obtained device based service for sorting device photographs, said service at least partly based on anonymized data acquiring module 502 and one or more entity-obtained device based services at least partly based on anonymized data receiving module 508. In some embodiments, module 502 may include one or more of entity-obtained device based service for sorting device photographs, said service at least partly based on anonymized data indicating a presence of a particular number of device photographs acquiring module 504 and entity-obtained device based service for sorting device photographs, said service at least partly based on anonymized data indicating a presence of a particular number of devices equipped with a camera acquiring module 506.

Figure 5B:
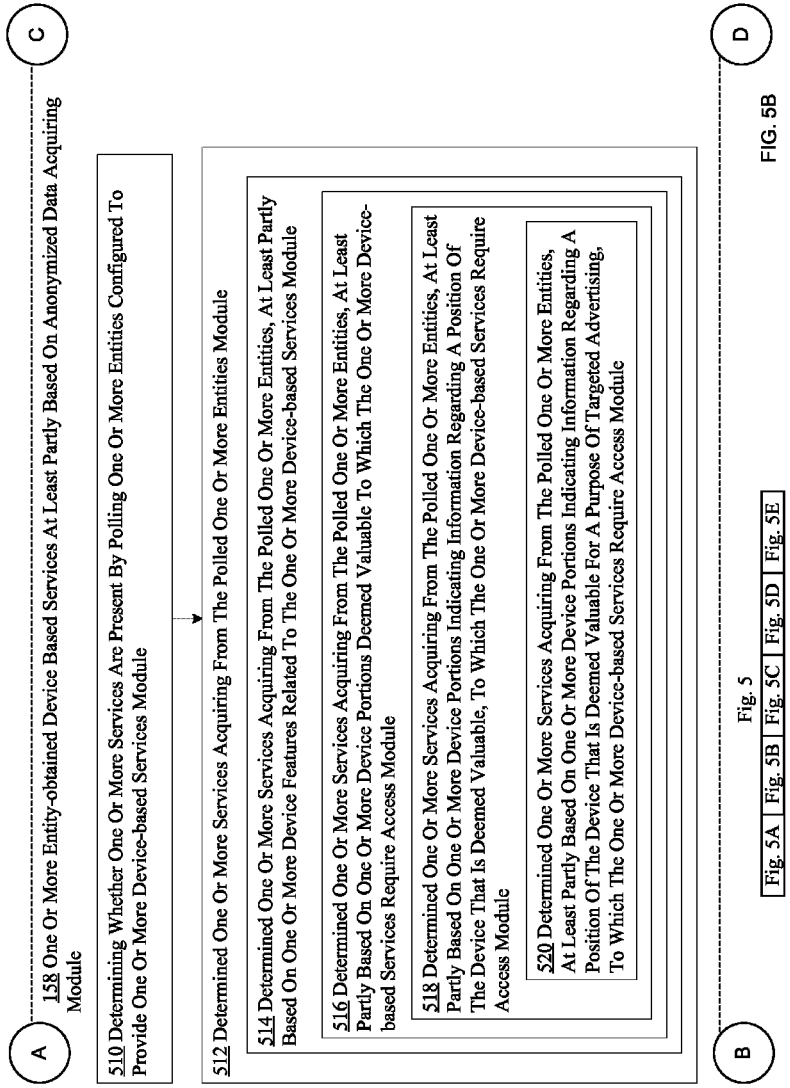

Referring again to FIG. 5, e.g., FIG. 5B, in some embodiments, module 158 may include one or more of determining whether one or more services are present by polling one or more entities configured to provide one or more device-based services module 510 and determined one or more services acquiring from the polled one or more entities module 512. In some embodiments, module 512 may include one or more of determined one or more services acquiring from the polled one or more entities, at least partly based on one or more device features related to the one or more device-based services module 514. In some embodiments, module 514 may include determined one or more services acquiring from the polled one or more entities, at least partly based on one or more device portions deemed valuable to which the one or more device-based services require access module 516. In some embodiments, module 516 may include determined one or more services acquiring from the polled one or more entities, at least partly based on one or more device portions indicating information regarding a position of the device that is deemed valuable, to which the one or more device-based services require access module 518. In some embodiments, module 518 may include determined one or more services acquiring from the polled one or more entities, at least partly based on one or more device portions indicating information regarding a position of the device that is deemed valuable for a purpose of targeted advertising, to which the one or more device-based services require access module 520.

Referring again to FIG. 5, e.g., FIG. 5C, in some embodiments, module 158 may include one or more of one or more entity-obtained device based services at least partly based on anonymized data receiving module 522, received one or more entity-obtained device based services at least partly based on anonymized data selecting module 524, one or more entity-obtained device based services at least partly based on anonymized data information regarding the service acquiring module 530, and deanonymization data configured to uniquely identify one or more devices offering in exchange for receiving the particular one or more entity-obtained device based services for which information was acquired module 532. In some embodiments, module 524 may include received one or more entity-obtained device based services at least partly based on anonymized data selecting at least partly based on analysis of anonymized data module 526. In some embodiments, module 526 may include received one or more entity-obtained device based services at least partly based on anonymized data selecting at least partly based on analysis of anonymized data indicating that web browsing history associated with a particular device may be obtained module 528.

Referring again to FIG. 5, e.g., FIG. 5D, in some embodiments, module 158 may include one or more entity-obtained device based services at least partly based on anonymized data acquiring by offering deanonymization data configured to uniquely identify the device module 534. In some embodiments, module 534 may include one or more of one or more entity-obtained device based services at least partly based on anonymized data acquiring by offering deanonymization data to a particular entity that generated a particular service, said deanonymization data configured to uniquely identify the device module 536 and permission to offer one or more entity-obtained device based services at least partly based on anonymized data acquiring by offering deanonymization data configured to uniquely identify the device module 544. In some embodiments, module 536 may include one or more entity-obtained device based services at least partly based on anonymized data acquiring by offering deanonymization data to a particular entity that generated a particular service, said deanonymization data configured to transform the anonymized data into data uniquely identifying the device module 538. In some embodiments, module 538 may include one or more of one or more entity-obtained device based services at least partly based on anonymized data acquiring by offering deanonymization data to a particular entity that generated a particular service, said deanonymization data configured to decrypt the anonymized data into data uniquely identifying the device module 540 and one or more entity-obtained device based services at least partly based on anonymized data acquiring by offering deanonymization data to a particular entity that generated a particular service, said deanonymization data configured to substituting the anonymized data for data uniquely identifying the device module 542.

Figure 5E:
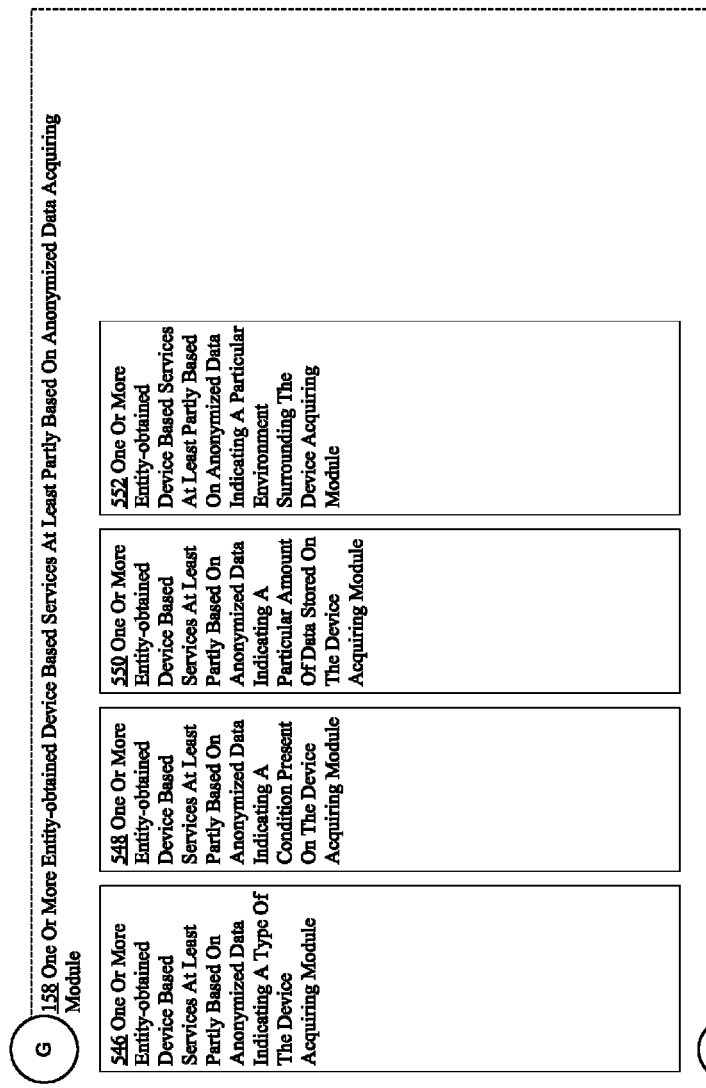

Referring again to FIG. 5, e.g., FIG. 5E, in some embodiments, module 158 may include one or more of one or more entity-obtained device based services at least partly based on anonymized data indicating a type of the device acquiring module 546, one or more entity-obtained device based services at least partly based on anonymized data indicating a condition present on the device acquiring module 548, one or more entity-obtained device based services at least partly based on anonymized data indicating a particular amount of data stored on the device acquiring module 550, and one or more entity-obtained device based services at least partly based on anonymized data indicating a particular environment surrounding the device acquiring module 552.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 6:
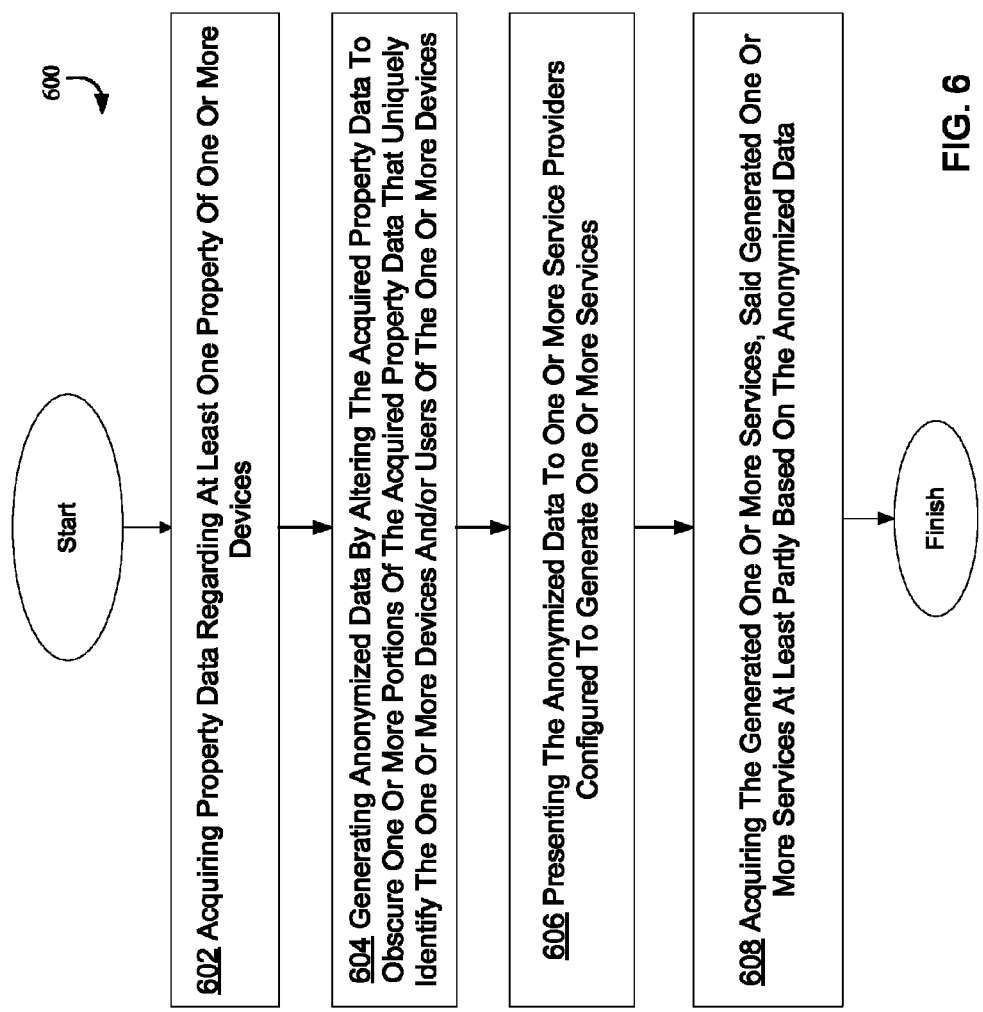
FIG. 6 is a high-level logic flowchart of a process, e.g., operational flow 600, according to an embodiment.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6-10 as well as the other operations to be described herein may be performed by at least one of a machine, an article of manufacture, or a composition of matter.

The following examples are provided merely as illustrations of how various embodiments may be implemented. None of the following examples are intended to be limiting, and all of the examples listed herein may be combined with portions of other examples listed herein, to the extent such combinations are not logically inconsistent. Because of space limitations, each example is not written out each time it is possible to implement that example. Therefore, unless explicitly otherwise stated, each example should be understood to encompass every other example listed both before and after the instant example, and can be combined with any or all portions of other examples. Each example is not intended to be limited to a single claim or set of claims, but is rather exemplary of how one or more embodiments may be carried out. Nothing in the following should be interpreted as limiting any claim or enumerating an exhaustive list of how one or more claimed embodiments can be carried out.

Referring now to FIG. 6, FIG. 6 shows operation 600, which may include operation 602 depicting acquiring property data regarding at least one property of one or more devices. For example, FIG. 1, e.g., FIG. 1B, shows anonymized data formed by modifying acquired attribute data to obscure a device and/or user identifying portion of the device attribute data generating module 152 acquiring (e.g., receiving, retrieving, picking up, creating, generating, intercepting, reading, hearing, detecting, and the like) property data (e.g., data about one or more properties, e.g., whether environment-dependent or environment independent, including, but not limited to, one or more of a status, characteristic, snapshot, feature, index, brand, configuration, attribute, algorithm, format, mode, flag setting, variable, data structure, and the like) regarding at least one property (e.g., any attribute of a device or any of the hardware, software, firmware, and the like, whether static or dynamic, permanent or temporary, whether dependent on a user of the device or not, and in an embodiment, may reflect entirely on the user or one or more actions taken out by the user) of one or more devices (e.g., a cellular phone, smart phone, IP phone, VOIP phone, handset, microphone, camera (e.g., video camera, still camera, digital camera, and the like), headphone, earpiece, screen, monitor, television, game system, receiver (e.g., an audio/visual receiver), media player (e.g., DVD player, Blu-ray player, CD player, MP3 player, cassette tape player), tablet device, netbook computer, notebook computer, router, wireless router, bridge, network equipment, server, desktop computer, personal computer, personal computer component (e.g., RAM, hard drive, video card, and the like), personal navigation system, vehicle navigation system, motor vehicle, motor vehicle stereo, motor vehicle control system, motor vehicle communication system (e.g., OnStar), appliance, security system (e.g., a home security system), electronic safety device (e.g., an electronic safe, a door security system, a door locking system), stereo system, speaker, remote control (e.g., a universal remote control, or a device remote control), radio, two-way radio, walkie-talkie, ham radio, a metal detector, a radar detector, a weather station, a robot (e.g., a Roomba), a vacuum cleaner, and the like).

Referring again to FIG. 6, operation 600 may include operation 604 depicting generating anonymized data by altering the acquired property data to obscure one or more portions of the acquired property data that uniquely identify the one or more devices and/or one or more users of the one or more devices. For example, FIG. 1, e.g., FIG. 1B, shows generating (e.g., creating, obtaining, instructing to create, causing to create, or otherwise originate or cause to be originated) anonymized data (e.g., data that does not uniquely identify one or more of a device and/or a device of the user, whether because that data is not there, is unreadable (e.g., encrypted), is altered, protected, or prevented from being accessed, deleted, and the like, or was never present, or has been aggregated or changed to disguise or camouflage specificity) by altering (e.g., modifying, changing, mutating, modifying, deleting from, adding to, encrypting, decrypting, compressing, expanding, combining, packaging, aggregating, reconstructing, modulating, adjusting, and the like) the acquired property data (e.g., data about one or more properties, e.g., whether environment-dependent or environment independent, including, but not limited to, one or more of a status, characteristic, snapshot, feature, index, brand, configuration, attribute, algorithm, format, mode, flag setting, variable, data structure, and the like) to obscure (e.g., to make more difficult to comprehend, in this example, to make it more difficult to comprehend a portion of the data that uniquely identifies the device, through any operation that results in different data than what was started) one or more portions of the acquired property data (e.g., data about one or more properties, e.g., whether environment-dependent or environment independent, including, but not limited to, one or more of a status, characteristic, snapshot, feature, index, brand, configuration, attribute, algorithm, format, mode, flag setting, variable, data structure, and the like) that uniquely identify (e.g., information that would specifically identify the device, or a user of the device, e.g., a MAC address, an IP address, whether static or dynamic, a server name, login information for one or more web sites, social networking sites, marketplaces, and the like) the one or more devices (e.g., any of the list of devices mentioned previously) and/or users of the one or more devices.

Referring again to FIG. 5, operation 600 may include operation 606 depicting presenting the anonymized data to one or more service providers configured to generate one or more services. For example. FIG. 1, e.g., FIG. 1B, shows presenting (e.g., facilitating one or more steps for making the one or more services aware of the anonymized data, through a screen presentation, or through transmission of some or all of the anonymized data, or through posting information regarding the anonymized data to a place where it may be seen by one or more service providers, and the like) the anonymized data (e.g., data that does not uniquely identify one or more of a device and/or a device of the user, whether because that data is not there, is unreadable (e.g., encrypted), is altered, protected, or prevented from being accessed, deleted, and the like, or was never present, or has been aggregated or changed to disguise or camouflage specificity) to one or more service providers (e.g., one or more entities that take one or more steps in the design, planning, implementation, review, feedback, carrying out, transfer, collecting payment for, or otherwise oversee, one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like)) configured to generate (e.g., take at least one step towards the creation, modification, upkeep, or maintenance of) one or more services (e.g., any task or portion of task as previously described).

Referring again to FIG. 5, operation 600 may include operation 608 depicting acquiring the generated one or more services, said generated one or more services at least partly based on the anonymized data. For example. FIG. 1, e.g., FIG. 1B, shows acquiring (e.g., receiving, retrieving, picking up, creating, generating, intercepting, reading, hearing, detecting, and the like) the generated one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like), said generated one or more services (e.g., any task as previously defined) at least partly based on the anonymized data (e.g., data that does not uniquely identify one or more of a device and/or a device of the user, whether because that data is not there, is unreadable (e.g., encrypted), is altered, protected, or prevented from being accessed, deleted, and the like, or was never present, or has been aggregated or changed to disguise or camouflage specificity).

Figure 7A:
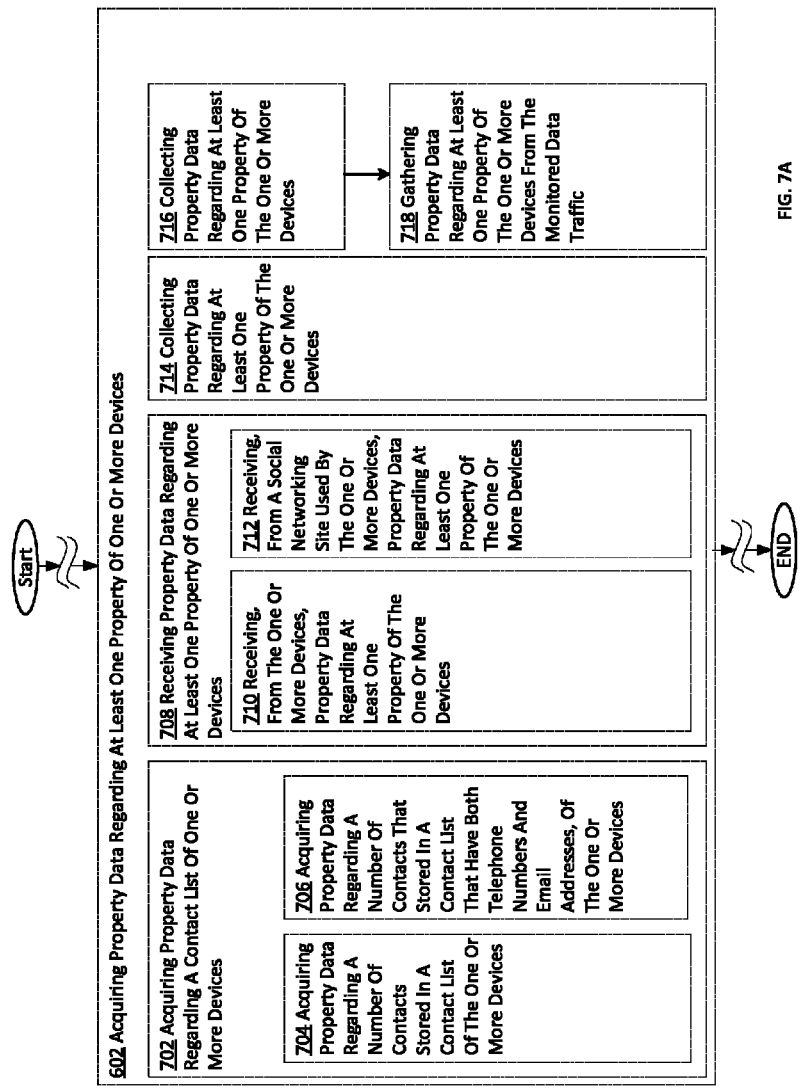
FIG. 7A is a high-level logic flow chart of a process depicting alternate implementations of an acquiring property data operation 602, according to one or more embodiments.

FIGS. 7A-7E depict various implementations of operation 602, depicting acquiring property data regarding at least one property of one or more devices according to embodiments. Referring now to FIG. 7A, operation 602 may include operation 702 depicting acquiring property data regarding a contact list of one or more devices. For example, FIG. 2, e.g., FIG. 2A, shows device contact list data related to a contact list attribute of a device obtaining module 202 acquiring property data (e.g., data indicating how much available storage space is on an SD card that is inserted into a device) regarding at least one property (e.g., the available SD card storage space) of one or more devices (e.g., one or more smartphones, tablet devices, and laptop computers).

Referring again to FIG. 7A, operation 702 may include operation 704 depicting acquiring property data regarding a number of contacts stored in a contact list of the one or more devices. For example, FIG. 2, e.g. FIG. 2A, shows contact list size data describing a number of contacts stored in a contact list of a device obtaining module 204 acquiring property data regarding a number of contacts stored in a contact list of the one or more devices (e.g., one or more desktop computers equipped with Microsoft Outlook and its contact list feature set).

Referring again to FIG. 7A, operation 702 may include operation 706 depicting acquiring property data regarding a number of contacts that are stored in a contact list for which a contact has both a telephone number and an email address, of the one or more devices. For example, FIG. 2, e.g., FIG. 2A, shows contact list size data describing a number of contacts stored in a contact list of a device that have both an email address and a telephone number obtaining module 206 acquiring property data regarding a number of contacts that are stored in a contact list that have a telephone number and an email address, of the one or more devices (e.g., a smartphone, which may communicate with an entity on a contact list via telephone and/or email).

Referring again to FIG. 7A, operation 602 may include operation 708 depicting receiving property data regarding at least one property of one or more devices. For example, FIG. 2, e.g., FIG. 2A, shows device attribute data related to one or more device attributes receiving module 208 receiving property data (e.g., data indicating a velocity) regarding at least one property (e.g., velocity) of one or more devices (e.g., personal portable navigation systems).

Referring again to FIG. 7A, operation 708 may include operation 710 depicting receiving, from the one or more devices, property data regarding at least one property of the one or more devices. For example, FIG. 2, e.g., FIG. 2A, shows device attribute data related to one or more device attributes receiving from the one or more devices module 210 receiving, from the one or more devices (e.g., one or more gaming systems), property data (e.g., data indicating how many hours a user has played first-person shooter games) regarding at least one property (e.g., hours of use of particular games) of the one or more devices (e.g., game systems, whether dedicated, e.g., an Xbox or PlayStation, or other devices used as game systems, e.g., tablet devices and laptop computers).

Referring again to FIG. 7A, operation 708 may include operation 712 depicting receiving, from a social networking site used by the one or more devices, property data regarding at least one property of the one or more devices. For example, FIG. 2, e.g., FIG. 2A, shows device attribute data related to one or more device attributes receiving from a social networking site module 212 receiving, from a social networking site (e.g., Facebook) used (e.g., logged into or viewed) by the one or more devices (e.g., one or more smartphones and/or tablet devices), property data regarding at least one property (e.g., a web browsing history) of the one or more devices.

Referring again to FIG. 7A, operation 602 may include operation 714 depicting collecting property data regarding at least one property of the one or more devices. For example, FIG. 2, e.g., FIG. 2A, shows device attribute data related to one or more device attributes collecting module 214 collecting property data (e.g., collecting upload speeds over a wireless network) regarding at least one property (e.g., upload speeds) of the one or more devices (e.g., one or more devices having a wireless radio).

Referring again to FIG. 7A, operation 602 may include operation 716 depicting monitoring data traffic of the one or more devices. For example, FIG. 2, e.g., FIG. 2A, shows device data communication via network monitoring module 216 monitoring (e.g., observing, watching, polling, receiving at particular intervals, receiving at random intervals, receiving upon triggering of a condition, and the like) data traffic (e.g., data transmitted to one or more other devices via a communication network, e.g., communication network 140) of the one or more devices (e.g., one or more enterprise computers connected over an enterprise network, e.g., a corporate intranet).

Referring again to FIG. 7A, operation 602 may include operation 718 depicting gathering property data regarding at least one property of the one or more devices from the monitored data traffic. For example, FIG. 2, e.g., FIG. 2A, shows attribute data related to one or more device attributes collecting through monitoring communication by the one or more devices over a communication network module 218 gathering property data (e.g., a number of pages printed on one or more corporate printers) regarding at least one property (e.g., data usage) of the one or more devices (e.g., networked computers on a corporate intranet) from the monitored data traffic (e.g., data transmitted over the network, whether wired, wirelessly, both, or some other form of communication).

Figure 7B:
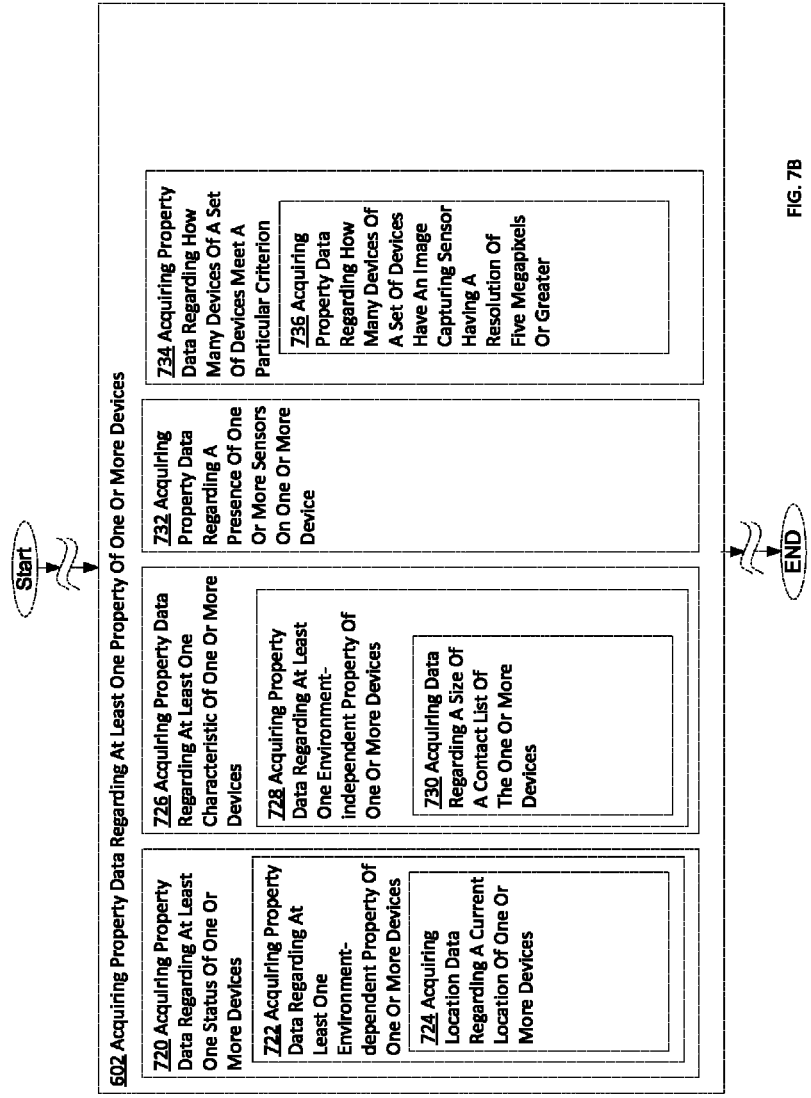
FIG. 7B is a high-level logic flow chart of a process depicting alternate implementations of an acquiring property data operation 602, according to one or more embodiments.

Referring now to FIG. 7B, operation 602 may include operation 720 depicting acquiring property data regarding at least one status of one or more devices. For example, FIG. 2, e.g., FIG. 2B, shows device attribute data related to a status of one or more devices obtaining module 220 acquiring property data (e.g., barometric pressure) regarding at least one status (e.g., an environment-dependent attribute, e.g., something that can change depending on the device's surroundings, even if a portion of the device does not change) of one or more devices (e.g., home weather monitoring systems that inform a user whether to take an umbrella or not before leaving for work).

Referring again to FIG. 7B, operation 720 may include operation 722 depicting acquiring property data regarding at least one environment-dependent property of one or more devices. For example, FIG. 2, e.g., FIG. 2B, shows device attribute data related to an environment-dependent property of one or more devices obtaining module 222 acquiring property data (e.g., velocity data) regarding at least one environment-dependent property (e.g., velocity) of one or more devices (e.g., an in-vehicle portable navigation system). It is noted here that even though the in-vehicle control system, depending on an implementation, may directly or indirectly control velocity of the motor vehicle, but velocity is still considered a status, rather than a characteristic, because it depends on a variable that is external to the device.

Referring again to FIG. 7B, operation 722 may include operation 724 depicting acquiring location data regarding a current location of one or more devices. For example, FIG. 2, e.g., FIG. 2B, shows device location data related to a present location of one or more devices obtaining module 224 acquiring location data regarding a current location of one or more devices (e.g., one or more internet-enabled video cameras).

Referring again to FIG. 7B, operation 602 may include operation 726 depicting acquiring property data regarding at least one characteristic of one or more devices. For example, FIG. 2, e.g., FIG. 2B, shows device attribute data related to a characteristic of one or more devices obtaining module 226 acquiring property data regarding at least one characteristic (e.g., a number of megapixels in a camera of the device) of one or more devices (e.g., a tablet device with a camera).

Referring again to FIG. 7B, operation 726 may include operation 728 depicting acquiring property data regarding at least one environment-independent property of one or more devices. For example, FIG. 2, e.g., FIG. 2B, shows device attribute data related to an environment-independent property of one or more devices obtaining module 228 acquiring property data regarding at least one environment-independent property (e.g., whether a device has a temperature sensor, or whether a device has a USB 3.0 port) of one or more devices (e.g., one or more laptop computers, or tablet devices).

Referring again to FIG. 7B, operation 728 may include operation 730 depicting acquiring data regarding a size of a contact list of the one or more devices. For example, FIG. 2, e.g., FIG. 2B, shows device contact list data related to an amount of memory taken up by a contact list stored on one or more devices obtaining module 230 acquiring data regarding a size of a contact list of the one or more devices (e.g., one or more tablet devices running a contact list manager software, e.g., Microsoft Outlook).

Referring again to FIG. 7B, operation 602 may include operation 732 depicting acquiring property data regarding a presence of one or more sensors on one or more devices. For example, FIG. 2, e.g., FIG. 2B, shows device sensor attribute data related to a presence of one or more sensors on more devices obtaining module 232 acquiring property data regarding a presence of one or more sensors (e.g., an altimeter) on one or more devices (e.g., a portable navigation system).

Referring again to FIG. 7B, operation 602 may include operation 734 depicting acquiring property data regarding how many devices of a set of devices meet a particular criterion. For example, FIG. 2, e.g., FIG. 2B, shows device criterion data related to number of devices that meet one or more criteria obtaining module 234 acquiring property data regarding how many devices of a set of devices meet a particular criterion (e.g., how many video game systems, e.g., Xbox 360, have more than five gigabytes of free space to install a new game on).

Referring again to FIG. 7B, operation 734 may include operation 736 depicting acquiring property data regarding how many devices of a set of devices have an image capturing sensor having a resolution of five megapixels or greater. For example, FIG. 2, e.g. FIG. 2B, shows device image capturing criterion data indicating a number of devices have an image capturing sensor having at least a resolution of five megapixels obtaining module 236 acquiring property data regarding how many devices of a set of devices (e.g., the set may be heterogeneous, e.g., include devices from different manufacturers, or different types of devices altogether, e.g., stationary computers with web cameras, and digital phones with cameras built into the base) have an image capturing sensor having a resolution of five megapixels or greater.

Figure 8A:
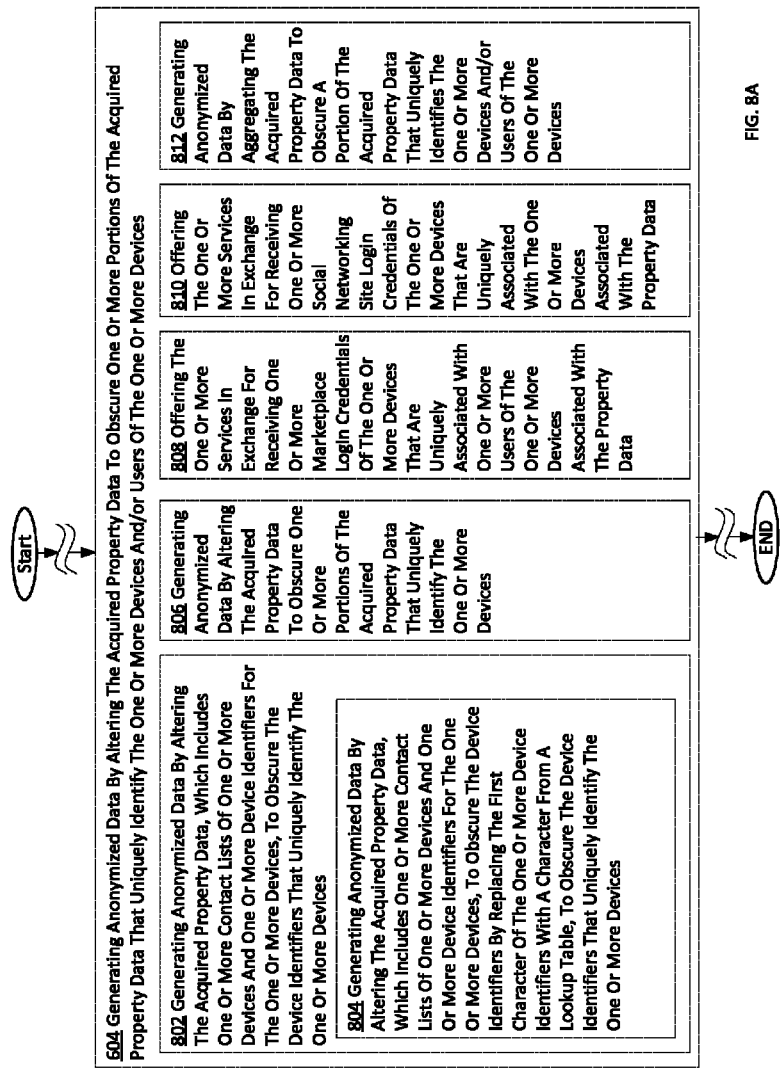
FIG. 8A is a high-level logic flow chart of a process depicting alternate implementations of a generating anonymized data operation 604, according to one or more embodiments.

FIGS. 8A-8D depict various implementations of operation 504, depicting generating anonymized data by altering the acquired property data to obscure one or more portions of the acquired property data that uniquely identify the one or more devices and/or one or more users of the one or more devices, according to embodiments. Referring now to FIG. 8A, operation 604 may include operation 802 depicting generating anonymized data by altering the acquired property data, which includes one or more contact lists of one or more devices and one or more device identifiers for the one or more devices, to obscure the device identifiers that uniquely identify the one or more devices. For example, FIG. 3, e.g., FIG. 3A, shows anonymized data formed by modifying acquired attribute data including one or more contact lists and one or more device identification numbers of one or more devices, to obscure a device and/or user identifying portion of the device attribute data generating module 302 generating anonymized data by altering the acquired property data (e.g., data indicating one or more pieces of information about a contact list stored on the device), which includes one or more contact lists of one or more devices and one or more device identifiers (e.g., for smartphones, a telephone number of the device) for the one or more devices, to obscure the device identifiers (e.g., by switching the odd-numbered digits with even-numbered digits) that uniquely identify (e.g., telephone numbers) the one or more devices (e.g., the one or more smartphones).

Referring again to FIG. 8A, operation 802 may include operation 804 depicting generating anonymized data by altering the acquired property data, which includes one or more contact lists of one or more devices and one or more device identifiers for the one or more devices, to obscure the device identifiers by replacing the first character of the one or more device identifiers with a character from a lookup table, to obscure the device identifiers that uniquely identify the one or more devices. For example, FIG. 3, e.g., FIG. 3A, shows anonymized data formed by modifying acquired attribute data including one or more contact lists and one or more device identification numbers of one or more devices, by substituting a particular character of the device identification number with a different character, to obscure a device and/or user identifying portion of the device attribute data generating module 304 generating anonymized data by altering the acquired property data, which includes one or more contact lists of one or more devices and one or more device identifiers (e.g., a device name given by the manufacturer and that is unique for the device) for the one or more devices, to obscure the device identifiers by replacing the first character of the one or more device identifiers with a character from a lookup table, to obscure the device identifiers that uniquely identify the one or more devices.

Referring again to FIG. 8A, operation 604 may include operation 806 depicting generating anonymized data by altering the acquired property data to obscure one or more portions of the acquired property data that uniquely identify the one or more devices. For example, FIG. 3, e.g., FIG. 3A, shows anonymized data formed by altering acquired attribute data to obscure a device and/or user identifying portion of the device attribute data generating module 306 generating anonymized data (e.g., data that does not uniquely identify a device and/or a user of the device) by altering the acquired property data to obscure one or more portions of the acquired property data (e.g., a device's last thirty locations) that uniquely identify the one or more devices.

Referring again to FIG. 8A, operation 604 may include operation 808 depicting generating anonymized data by altering the acquired property data to obscure one or more portions of the acquired property data that uniquely identify the users of the one or more devices. For example, FIG. 3, e.g., FIG. 3A, shows anonymized data formed by altering acquired attribute data to obscure a device user identifying portion of the device attribute data generating module 308 generating anonymized data by altering the acquired property data to obscure one or more portions of the acquired property data (e.g., a user's social security number) that uniquely identify the users of the one or more devices (e.g., a bank-issued remote connection device).

Referring again to FIG. 8A, operation 604 may include operation 810 depicting generating anonymized data by altering the acquired property data to remove one or more portions of the acquired property data that uniquely identify the one or more devices and/or users of the one or more devices. For example, FIG. 3, e.g., FIG. 3A, shows anonymized data formed by deleting at least a portion of acquired attribute data to obscure a device and/or user identifying portion of the device attribute data generating module 310 generating anonymized data by altering the acquired property data (e.g., whether the device is located in Seattle, Wash.) to remove one or more portions of the acquired property data (e.g., a device identification number) that uniquely identify the one or more devices and/or users of the one or more devices.

Referring again to FIG. 8A, operation 604 may include operation 812 depicting generating anonymized data by aggregating the acquired property data to obscure a portion of the acquired property data that uniquely identifies the one or more devices and/or users of the one or more devices. For example, FIG. 3, e.g., FIG. 3A, shows anonymized data formed by aggregating at least a portion of acquired attribute data to obscure a device and/or user identifying portion of the device attribute data generating module 312 generating anonymized data by aggregating (e.g., taking location data from twenty different devices, and twenty device identifiers, and packaging them together, so that a specific device identifier cannot be matched to a specific one of the twenty different locations, so that a device can only be identified with 1-in-20 accuracy, which is not uniquely identifying) the acquired property data to obscure a portion of the acquired property data (e.g., a recorded decibel level at the device's location) that uniquely identifies the one or more devices and/or users of the one or more devices.

Figure 8B:
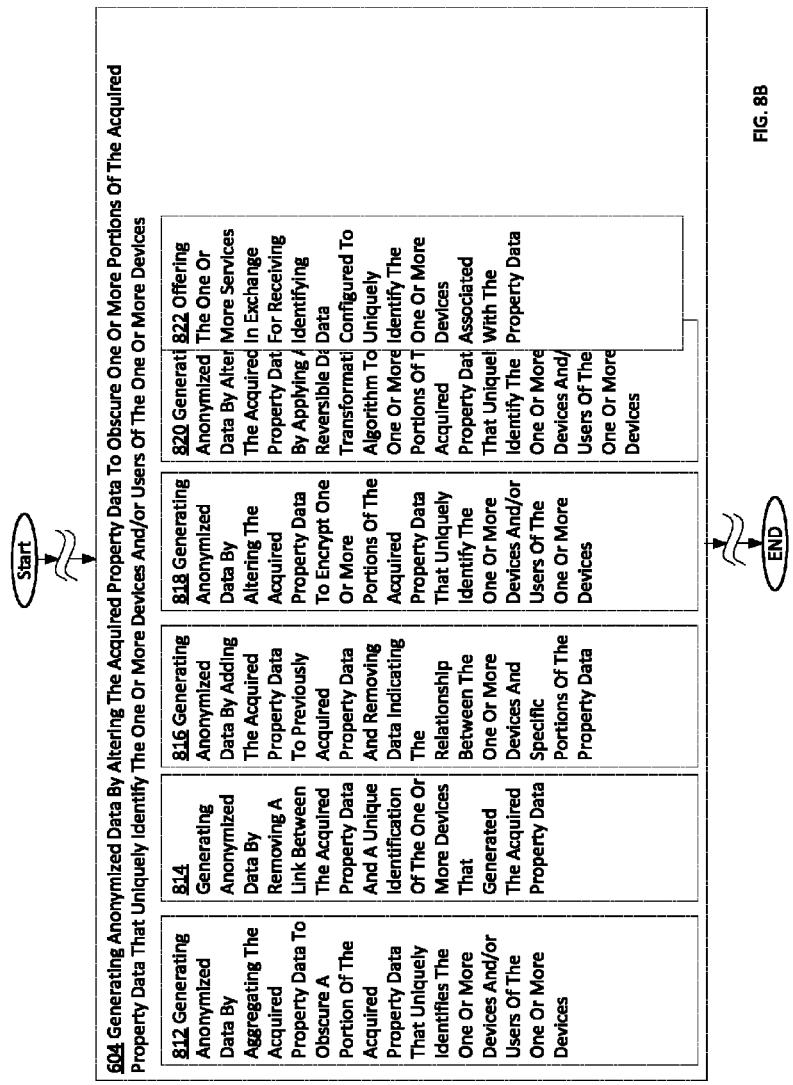
FIG. 8B is a high-level logic flow chart of a process depicting alternate implementations of a generating anonymized data operation 604, according to one or more embodiments.

Referring now to FIG. 8B, operation 604 may include operation 814 depicting generating anonymized data by removing a link between the acquired property data and a unique identification of the one or more devices that generated the acquired property data. For example, FIG. 3, e.g., FIG. 3B, shows anonymized data formed by modifying acquired attribute data to remove a link between a device identification portion of the acquired attribute data and an other portion of the acquired attribute data, to obscure a device and/or user identifying portion of the device attribute data generating module 314 generating anonymized data by removing a link between the acquired property data (e.g., an amount of RAM installed in a laptop computer) and a unique identification (e.g., the serial number from a copy of Windows running on the device) of the one or more devices that generated the acquired property data.

Referring again to FIG. 8B, operation 604 may include operation 816 depicting generating anonymized data by adding the acquired property data to previously acquired property data and removing data indicating the relationship between the one or more devices and one or more specific portions of the property data that uniquely identify the one or more devices. For example, FIG. 3, e.g., FIG. 3B, shows anonymized data formed by adding acquired attribute data to previously acquired property data and removing specific relational information between the one or more devices and the acquired attribute data, to obscure a device and/or user identifying portion of the device attribute data generating module 316 generating anonymized data by adding the acquired property data (e.g., velocity of one or more vehicle-mounted personal navigation devices) to previously acquired property data and removing data indicating the relationship between the one or more devices and specific portions of the property data that uniquely identify the one or more devices (e.g., the data includes a set of device identifiers, and a set of velocity data, but not the connection between which device identifier to which velocity data, e.g., which may be useful for insurance companies and/or law enforcement agencies to determine where speeding is taking place).

Referring again to FIG. 8B, operation 604 may include operation 818 depicting generating anonymized data by altering the acquired property data to encrypt one or more portions of the acquired property data that uniquely identify the one or more devices and/or users of the one or more devices. For example, FIG. 3, e.g., FIG. 3B, shows anonymized data formed by encrypting at least a portion of acquired attribute data to obscure a device and/or user identifying portion of the device attribute data generating module 318 generating anonymized data by altering the acquired property data (e.g., location data) to encrypt one or more portions of the acquired property data that uniquely identify the one or more devices and/or users of the one or more devices.

Referring again to FIG. 8B, operation 604 may include operation 820 depicting generating anonymized data by altering the acquired property data by applying a reversible data transformation algorithm to one or more portions of the acquired property data that uniquely identify the one or more devices and/or users of the one or more devices. For example, FIG. 3, e.g., FIG. 3B, shows anonymized data formed by modifying acquired attribute data using a reversible data transformation algorithm to obscure a device and/or user identifying portion of the device attribute data generating module 320 generating anonymized data by altering the acquired property data (e.g., an ambient light amount detected by the device) by applying a reversible data transformation algorithm to one or more portions of the acquired property data that uniquely identify the one or more devices and/or users of the one or more devices.

Referring again to FIG. 8B, operation 604 may include operation 822 depicting generating anonymized data by altering the acquired property data by replacing one or more portions of the acquired property data that uniquely identify the one or more devices and/or users of the one or more devices with a value stored in a lookup table. For example, FIG. 3, e.g., FIG. 3B, shows anonymized data formed by replacing a portion of the acquired attribute data with a lookup table value, to obscure a device and/or user identifying portion of the device attribute data generating module 322 generating anonymized data by altering the acquired property data by replacing one or more portions of the acquired property data (e.g., the device name) that uniquely identify the one or more devices and/or users of the one or more devices with a value stored in a lookup table (e.g., the data is replaced with "user062462," and in the lookup table, for the index value "user062462," the actual device name is placed in the lookup table).

Figure 8C:
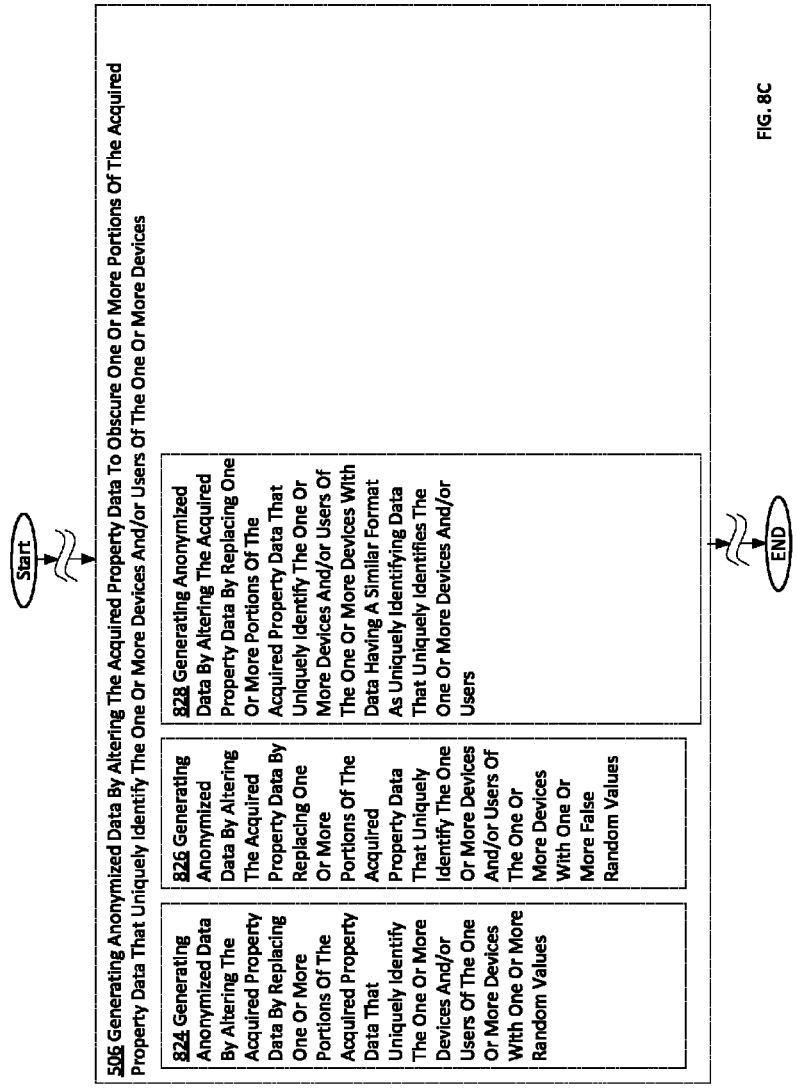
FIG. 8C is a high-level logic flow chart of a process depicting alternate implementations of a generating anonymized data operation 604, according to one or more embodiments.

Referring now to FIG. 8C, operation 604 may include operation 824 depicting generating anonymized data by altering the acquired property data by replacing one or more portions of the acquired property data that uniquely identify the one or more devices and/or users of the one or more devices with one or more random values. For example, FIG. 3, e.g., FIG. 3C, shows anonymized data formed by replacing at least a portion of the acquired attribute data with random data, to obscure a device and/or user identifying portion of the device attribute data generating module 324 generating anonymized data bay altering the acquired property data by replacing one or more portions of the acquired property data (e.g., an IP address) that uniquely identify the one or more devices (e.g., one or more desktop computers connected to the Internet) and/or users of the one or more devices with one or more random values (e.g., replacing at least a portion of the IP address with numbers generated from a random number generator).

Referring again to FIG. 8C, operation 604 may include operation 826 depicting generating anonymized data by altering the acquired property data by replacing one or more portions of the acquired property data that uniquely identify the one or more devices and/or users of the one or more devices with one or more false random values. For example, FIG. 3, e.g., FIG. 3C, shows anonymized data formed by replacing at least a portion of the acquired attribute data with false random data, to obscure a device and/or user identifying portion of the device attribute data generating module 326 generating anonymized data by altering the acquired property data by replacing one or more portions of the acquired property data that uniquely identify the one or more devices and/or users of the one or more devices with one or more false random values (e.g., values generated by an algorithm in a repeatable manner, but without knowing the algorithm, appear to be random).

Referring again to FIG. 8C, operation 604 may include operation 828 depicting generating anonymized data by altering the acquired property data by replacing one or more portions of the acquired property data that uniquely identify the one or more devices and/or users of the one or more devices with data having a similar format as uniquely identifying data that uniquely identifies the one or more devices and/or users. For example, FIG. 3, e.g., FIG. 3C, shows anonymized data formed by replacing at least a portion of the acquired attribute data with data having a particular obscuring format, to obscure a device and/or user identifying portion of the device attribute data generating module 328 generating anonymized data by altering the acquired property data (e.g., location data) by replacing one or more portions of the acquired property data that uniquely identify the one or more devices (e.g., a device name assigned by the user upon initial device setup and transmitted to a manufacturer of the device for registration purposes) with data having similar format (e.g., a device name, e.g., that looks like a real name, e.g., "Bob's kitchen computer") as uniquely identifying data that uniquely identifies the one or more devices and/or users.

Figure 9A:
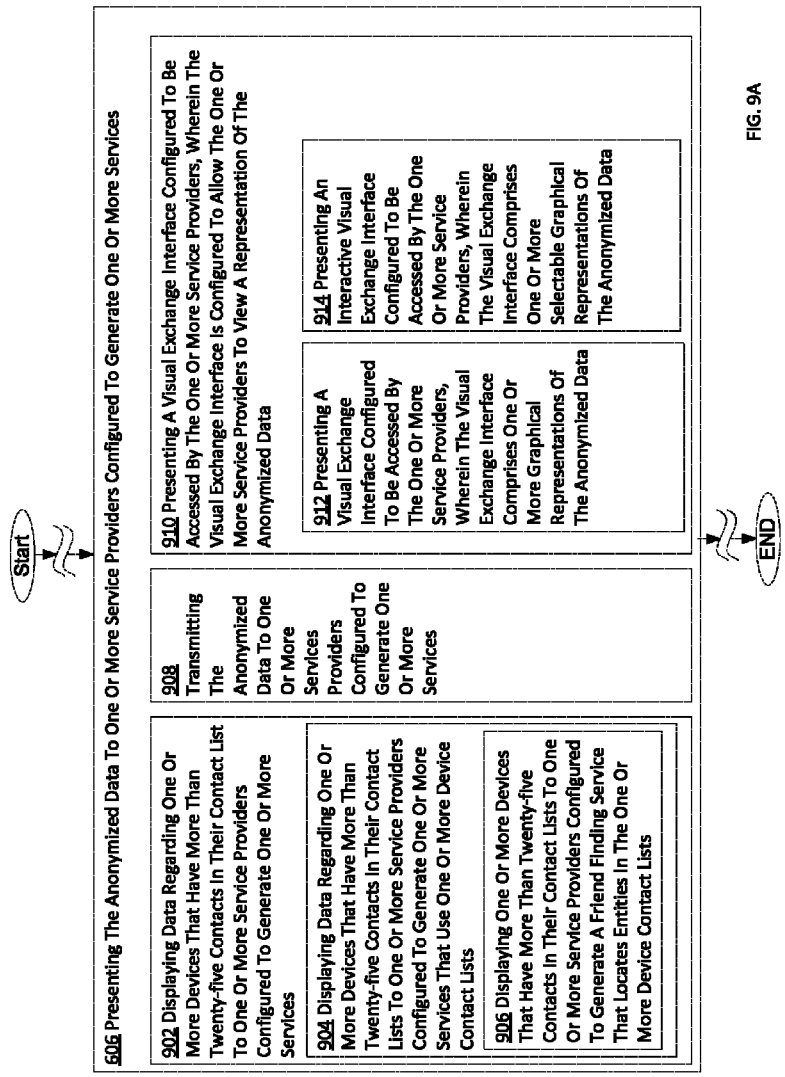
FIG. 9A is a high-level logic flow chart of a process depicting alternate implementations of a presenting the anonymized data operation 606, according to one or more embodiments.
Figure 9B:
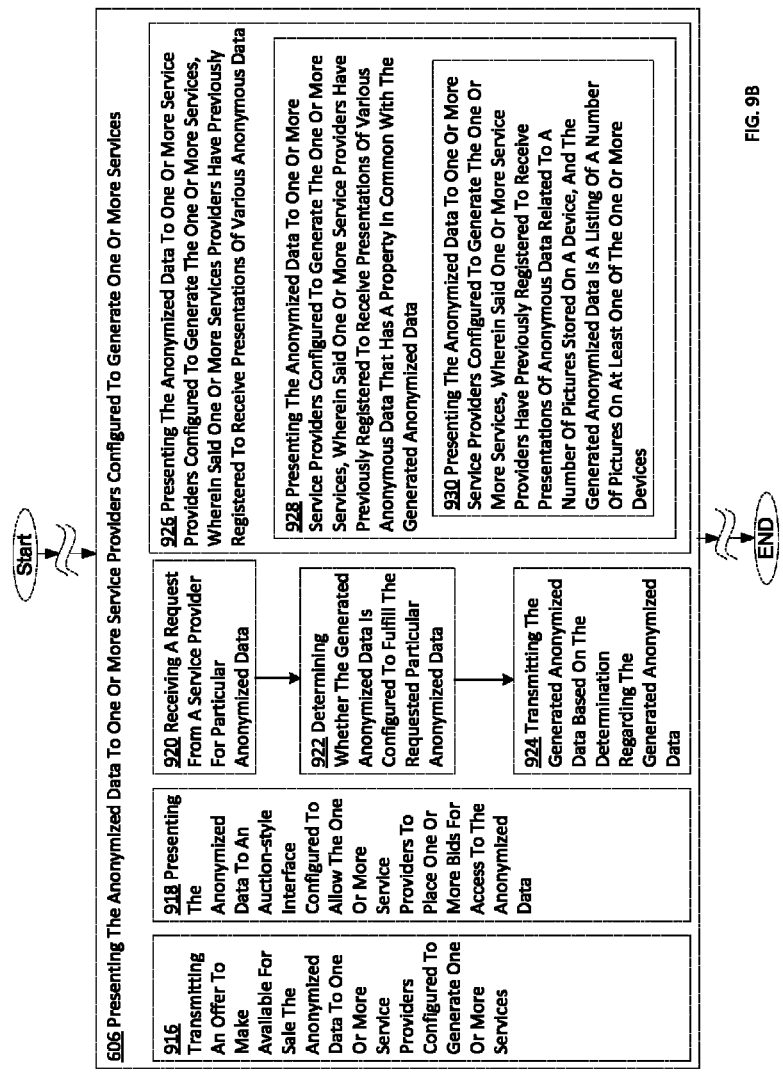
FIG. 9B is a high-level logic flow chart of a process depicting alternate implementations of a presenting the anonymized data operation 606, according to one or more embodiments.
Figure 9C:
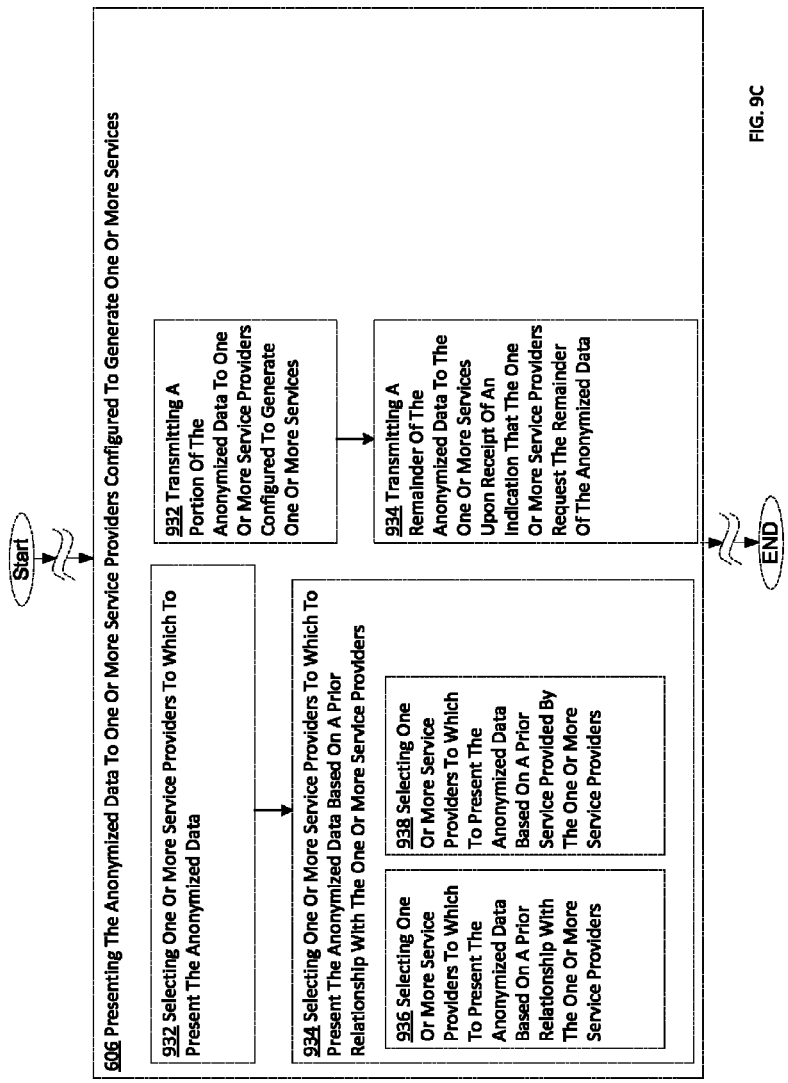
FIG. 9C is a high-level logic flow chart of a process depicting alternate implementations of a presenting the anonymized data operation 606, according to one or more embodiments.

FIGS. 9A-9C depict various implementations of operation 606 depicting presenting the anonymized data to one or more service providers configured to generate one or more services, according to embodiments. Referring now to FIG. 9A, operation 606 may include operation 902 depicting displaying data regarding one or more devices that have more than twenty-five contacts in their contact list to one or more service providers configured to generate one or more services. For example, FIG. 4, e.g., FIG. 4A, shows anonymized data presentation to one or more entities configured to obtain one or more device-based services for one or more devices having more than a predetermined number of contacts in a device contact list facilitating module 402 displaying (e.g., displaying on a device, or causing a device to display on its output portion, e.g., screen) data regarding one or more devices (e.g., smartphones) that have more than twenty-five contacts in their contact list to one or more service providers configured to generate one or more services (e.g., a genealogy service).

Referring again to FIG. 9A, operation 902 may include operation 904 depicting displaying data regarding one or more devices that have more than twenty-five contacts in their contact lists to one or more service providers configured to generate one or more services that use one or more device contact lists. For example, FIG. 4, e.g., FIG. 4A, shows anonymized data displaying to one or more entities configured to obtain one or more device contact list-based services for one or more devices having more than a predetermined number of contacts in a device contact list facilitating module 404 displaying data regarding one or more devices that have more than twenty-five contacts in their contact lists to one or more service providers (e.g., one or more entities, whether persons, corporate entities, or automated service providers) configured to generate one or more services (e.g., a mass-notification service) that use one or more device contact lists.

Referring again to FIG. 9A, operation 904 may include operation 906 depicting displaying one or more devices that have more than twenty-five contacts in their contact lists to one or more service providers configured to generate a friend finding service that locates entities in the one or more device contact lists. For example, FIG. 4, e.g., FIG. 4A, shows anonymized data displaying to one or more entities configured to obtain a friend-finding contact list-based service for one or more devices having more than a predetermined number of contacts in a device contact list facilitating module 406 displaying one or more devices that have more than twenty-five contacts in their contact lists to one or more service providers configured to generate a friend-finding service that locates entities in the one or more device contact lists.

Referring again to FIG. 9A, operation 606 may include operation 908 depicting transmitting the anonymized data to one or more service providers configured to generate one or more services. For example, FIG. 4, e.g., FIG. 4A, shows anonymized data transmission to one or more entities configured to obtain one or more device-based services facilitating module 408 transmitting the anonymized data to one or more service providers (e.g., an outdoors company, e.g., REI, as a service provider provides an application that tracks people on hiking trails) configured to generate one or more services (e.g., a hiking assistance service).

Referring again to FIG. 9A, operation 606 may include operation 910 depicting presenting a visual exchange interface configured to be accessed by the one or more service providers, wherein the visual exchange interface is configured to allow the one or more service providers to view a representation of the anonymized data. For example, FIG. 4, e.g., FIG. 4A, shows anonymized data presentation via a visual exchange interface to one or more entities configured to obtain one or more device-based services facilitating module 410 presenting a visual exchange interface (e.g., a front-end where various services can be viewed, e.g., a store, an auction site, a listing, a database, and the like) configured to be accessed by the one or more service providers (e.g., a ticket distribution company, e.g., Ticketmaster, that may provide ticket matching services), wherein the visual exchange interface is configured to allow the one or more service providers to view a representation of the anonymized data (e.g., an indication of what anonymized data is available, either a graphical representation, a description, a subset, or the like).

Referring again to FIG. 9A, operation 910 may include operation 912 depicting presenting a visual exchange interface configured to be accessed by the one or more service providers, wherein the visual exchange interface comprises one or more graphical representations of the anonymized data. For example, FIG. 4, e.g., FIG. 4A, shows anonymized data presentation via a visual exchange interface designed for one or more service providing entities to the one or more service providing entities configured to obtain one or more device-based services facilitating module 412 presenting a visual exchange interface configured to be accessed by the one or more service providers (e.g., various gym and athletic training service providers that design training applications for devices), wherein the visual exchange interface comprises one or more graphical representations (e.g., an icon, or a graph representing the anonymized data in aggregate form, e.g., a pie chart indicating that 65% of devices have a particular feature) of the anonymized data.

Referring again to FIG. 9A, operation 910 may include operation 914 depicting presenting an interactive visual exchange interface configured to be accessed by the one or more service providers, wherein the visual exchange interface comprises one or more selectable graphical representations of the anonymized data. For example, FIG. 4, e.g., FIG. 4A, shows anonymized data presentation via an interactive visual exchange interface to one or more entities configured to obtain one or more device-based services facilitating module 414 presenting an interactive visual exchange interface configured to be accessed by the one or more service providers (e.g., a device manufacturer, e.g., Apple, provides various services to be used on their devices, e.g., mapping, restaurant queries, and the like), wherein the visual exchange interface comprises one or more selectable graphical representations (e.g., icons) of the anonymized data.

Referring now to FIG. 9B, operation 606 may include operation 916 depicting transmitting an offer to make available for sale the anonymized data to one or more service providers configured to generate one or more services. For example, FIG. 4, e.g., FIG. 4B, shows anonymized data offer for sale transmission to one or more entities configured to obtain one or more device-based services facilitating module 416 transmitting an offer to make available for sale the anonymized data (e.g., data indicating how many devices have three or more bicycling applications already installed) to one or more service providers (e.g., a bicycle manufacturer trying to design a service and deliver to a likely audience) configured to generate one or more services (e.g., a bike tire inflation monitoring service).

Referring again to FIG. 9B, operation 606 may include operation 918 depicting presenting the anonymized data to an auction-style interface configured to allow the one or more service providers to place one or more bids for access to the anonymized data. For example, FIG. 4, e.g., FIG. 4B, shows anonymized data presentation in a bid auction format to one or more entities configured to obtain one or more device-based services facilitating module 418 presenting the anonymized data to an auction-style interface configured to allow the one or more service providers (e.g., an alcohol distribution service that wants to bid on data showing how many devices spend more than four hours a week at various bars in a city) to place one or more bids for access to the anonymized data (e.g., aggregated location data).

Referring again to FIG. 9B. operation 606 may include operation 920 depicting receiving a request from a service provider for particular anonymized data. For example, FIG. 4, e.g., FIG. 4B, shows one or more entities configured to obtain one or more device-based services request for particular anonymized data receiving module 420 receiving a request from a service provider (e.g., a weight-loss corporation creating a calorie counting service) for particular anonymized data (e.g., data indicating a person's weight and body mass index (BMI), with the data stored on the one or more devices).

Referring again to FIG. 9B, operation 606 may include operation 922 depicting determining whether the generated anonymized data is configured to fulfill the requested particular anonymized data. For example, FIG. 4, e.g., FIG. 4B, shows anonymized data suitability for fulfilling request for particular anonymized data determining module 422 determining whether the generated anonymized data (e.g., does the generated anonymized data, which has user profiles that were entered into various sites, e.g., social networking sites or dating sites) is configured to fulfill (e.g., has aggregated weights of users) the requested particular anonymized data (e.g., aggregated person's weight and BMI).

Referring again to FIG. 9B, operation 606 may include operation 924 depicting transmitting the generated anonymized data based on the determination regarding the generated anonymized data. For example, FIG. 4, e.g., FIG. 4B, shows at least a portion of anonymized data transmitting in response to request for particular anonymized data module 424 transmitting the generated anonymized data (e.g., aggregated person's weight and BMI) based on the determination regarding the generated anonymized data.

Referring again to FIG. 9B, operation 606 may include operation 926 depicting presenting the anonymized data to one or more service providers configured to generate the one or more services, wherein said one or more service providers have previously registered to receive presentations of various anonymous data. For example, FIG. 4, e.g., FIG. 4B, shows anonymized data presentation to one or more entities that previously registered to receive anonymized data and are configured to obtain one or more device-based services facilitating module 426 presenting the anonymized data to one or more service providers (e.g., music label producers creating a service that delivers new music in a user's preferred genre to their device) configured to generate the one or more services, wherein said one or more service providers have previously registered to receive presentations of various anonymous data.

Referring again to FIG. 9B, operation 926 may include operation 928 depicting presenting the anonymized data to one or more service providers configured to generate the one or more services, wherein said one or more service providers have previously registered to receive presentations of various anonymous data that has a property in common with the generated anonymized data. For example, FIG. 4, e.g., FIG. 4B, shows anonymized data presentation to one or more entities that previously registered to receive anonymized data having a particular property and are configured to obtain one or more device-based services facilitating module 428 presenting the anonymized data (e.g., anonymized velocity and temperature data) to one or more service providers (e.g., a provider of a service that locates water stops for runners) configured to generate the one or more services (e.g., a service that finds water fountains along a route being run by a runner carrying a personal device), wherein said one or more service providers have previously registered to receive presentations of various anonymous data (e.g., data tracking locations) that has a property in common with the generated anonymized data (e.g., which is location and temperature data).

Referring again to FIG. 9B, operation 928 may include operation 930 depicting presenting the anonymized data to one or more service providers configured to generate the one or more services, wherein said one or more service providers have previously registered to receive presentations of anonymous data related to a number of pictures stored on a device, and the generated anonymized data is a listing of a number of pictures on at least one of the one or more devices. For example, FIG. 4, e.g., FIG. 4B, shows anonymized data presentation to one or more entities that previously registered to receive anonymized data collected from one or more devices having more than a particular number of pictures stored on the one or more devices and are configured to obtain one or more device-based services facilitating module 430 presenting the anonymized data to one or more service providers (e.g., a photo developing company that wants to develop a photo sorting service) configured to generate the one or more services (e.g., a digital photograph sorting service), wherein said one or more service providers have previously registered to receive presentations of anonymous data related to a number of pictures stored on a device, and the generated anonymized data is a listing of a number of pictures on at least one of the one or more devices.

Referring now to FIG. 9C, operation 606 may include operation 932 depicting receiving a request from one or more service providers to receive the anonymized data. For example, FIG. 4, e.g., FIG. 4C, shows anonymized data request from one or more entities configured to obtain one or more device-based services receiving module 432 receiving a request from one or more service providers (e.g., broadband internet service providers that want to create an application that tracks average upload speeds) to receive the anonymized data (e.g., achieved upload speeds at various times)

Referring again to FIG. 9C, operation 606 may include operation 934 depicting selecting one or more service providers to which to present the anonymized data. For example, FIG. 4, e.g., FIG. 4C, shows one or more entities configured to obtain one or more device-based services that requested anonymized data selecting module 434 selecting one or more service providers (e.g., selecting, from various telecom service providers) to which to present the anonymized data (e.g., achieved upload speeds at various times and various locations).

Referring again to FIG. 9C, operation 934 may include operation 936 depicting selecting one or more service providers to which to present the anonymized data based on a prior relationship with the one or more service providers. For example, FIG. 4, e.g., FIG. 4C, shows selecting one or more service providers to which to present the anonymized data based on a prior relationship with one or more entities configured to obtain one or more device-based services that requested anonymized data selecting at least partly based on entity prior relationship module 436 selecting one or more service providers (e.g., for weight loss services) to which to present the anonymized data (e.g., calorie tracking data manually inputted by users into a device) based on a prior relationship (e.g., a selected service provider already has a contract and is a well-known name, e.g., Weight Watchers)) with the one or more service providers.

Referring again to FIG. 9C, operation 934 may include operation 938 depicting selecting one or more service providers to which to present the anonymized data based on a prior service provided by the one or more service providers. For example, FIG. 4, e.g., FIG. 4C, shows one or more entities configured to obtain one or more device-based services that requested anonymized data selecting at least partly based on entity prior service obtained module 438 selecting one or more service providers to which to present the anonymized data based on a prior service provided by the one or more service providers (e.g., a selected service provider previously provided a service that was widely accepted by devices and gained lots of profits).

Referring again to FIG. 9C, operation 606 may include operation 940 depicting transmitting a portion of the anonymized data to one or more service providers configured to generate one or more services. For example, FIG. 4, e.g., FIG. 4C, shows portion of anonymized data transmission to one or more entities configured to obtain one or more device-based services facilitating module 440 transmitting a portion of the anonymized data (e.g., a sample of the data, for example, if the anonymized data includes anonymous velocity data for five hundred devices, sending anonymous velocity data for ten devices) to one or more service providers (e.g., an insurance company designing an application for in-vehicle control systems) configured to generate one or more services (e.g., an insurance company designing an application for in-vehicle control systems). It is noted that the portion of the anonymized data to be transmitted may be selected randomly, or may be selected by a human, or may be selected by any process, set of steps, or algorithm.

Referring again to FIG. 9C, operation 606 may include operation 942 depicting transmitting a remainder of the anonymized data to the one or more services upon receipt of an indication that the one or more service providers request the remainder of the anonymized data. For example, FIG. 4, e.g., FIG. 4C, shows remainder of anonymized data transmission to one or more entities configured to obtain one or more device-based services facilitating in response to a received indication from the one or more entities requesting the remainder of anonymized data module 442 transmitting a remainder of the anonymized data to the one or more services upon receipt of an indication that the one or more service providers request the remainder of the anonymized data (e.g., the other four hundred and ninety-five anonymized velocity readings).

Figure 10A:
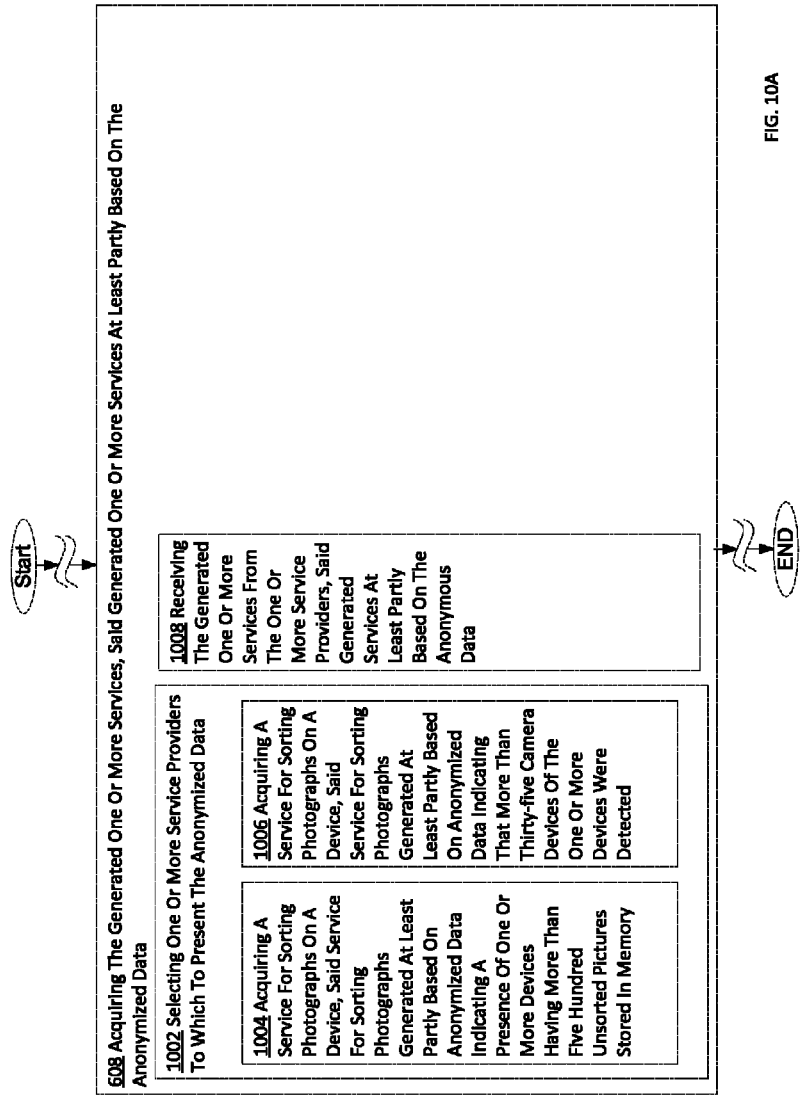
FIG. 10A is a high-level logic flow chart of a process depicting alternate implementations of an acquiring the generated one or more services operation 608, according to one or more embodiments.
Figure 10B:
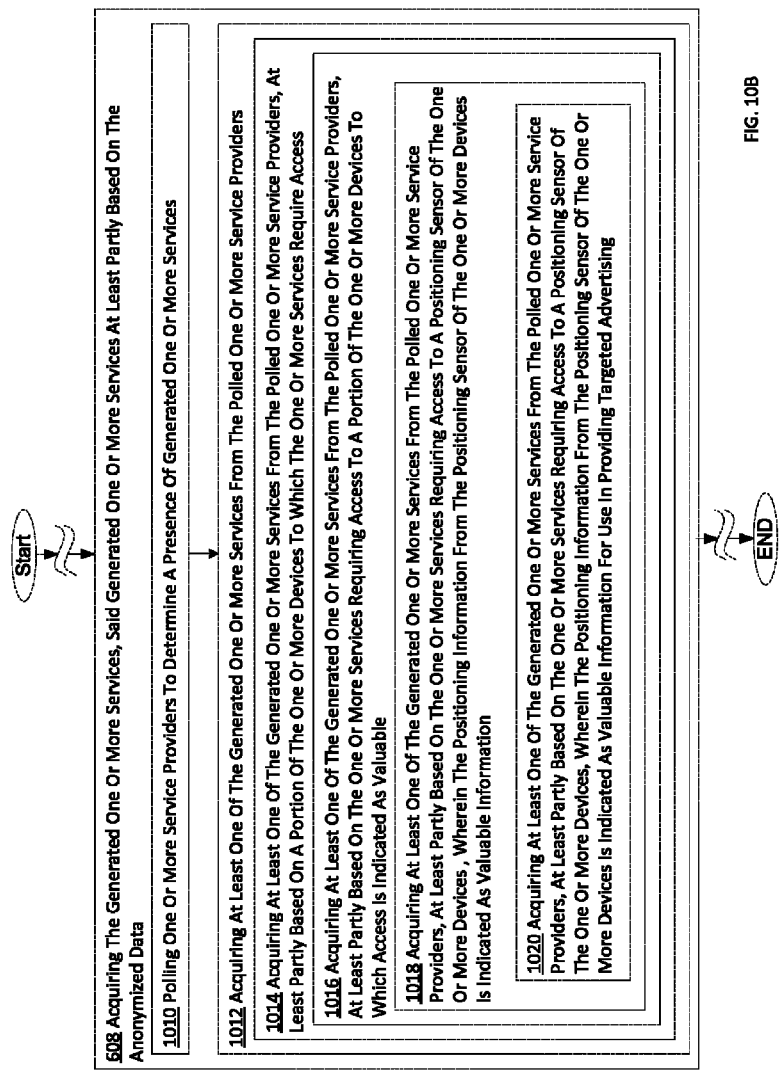
FIG. 10B is a high-level logic flow chart of a process depicting alternate implementations of an acquiring the generated one or more services operation 608, according to one or more embodiments.
Figure 10C:
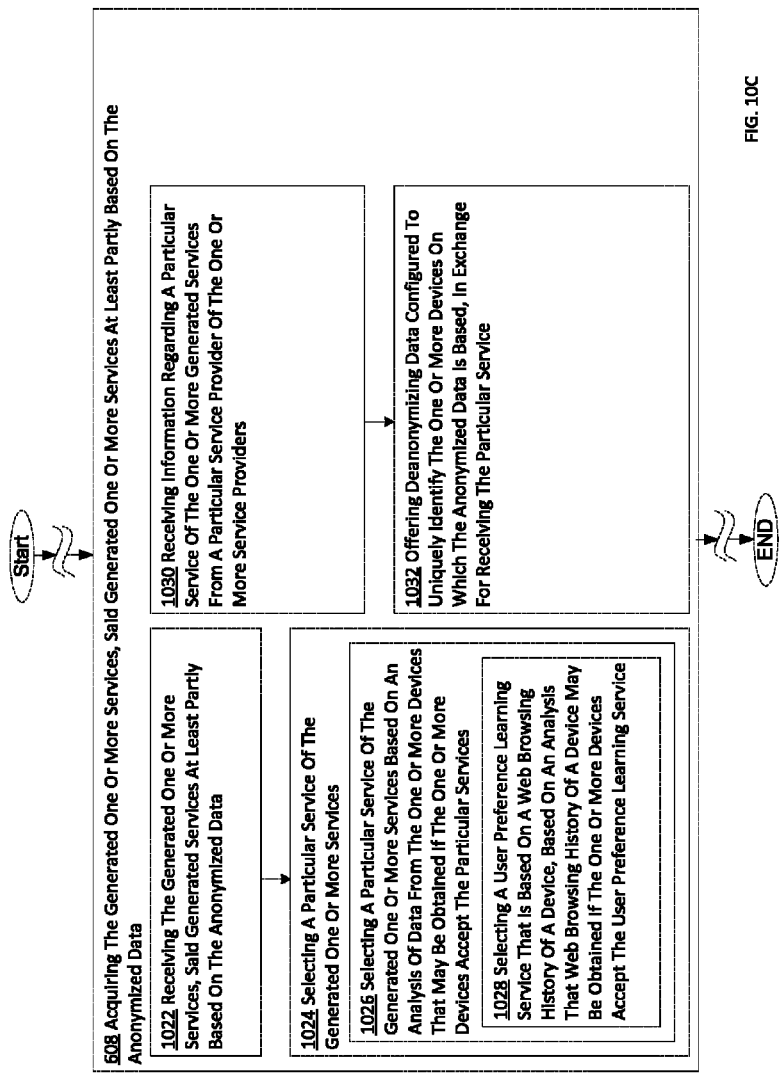
FIG. 10C is a high-level logic flow chart of a process depicting alternate implementations of an acquiring the generated one or more services operation 608, according to one or more embodiments.

FIGS. 10A-10C depict various implementations of operation 608 depicting acquiring the generated one or more services, said generated one or more services at least partly based on the anonymized data, according to embodiments. Referring now to FIG. 10A, operation 608 may include operation 1002 depicting acquiring a service for sorting photographs on a device, said service for sorting photographs generated at least partly based on the anonymized data. For example, FIG. 5, e.g., FIG. 5A, shows entity-obtained device based service for sorting device photographs, said service at least partly based on anonymized data acquiring module 502 acquiring a service for sorting photographs on a device, said service for sorting photographs generated at least partly based on the anonymized data (e.g., data showing how many pictures are stored in each directory on the device).

Referring again to FIG. 10A, operation 1002 may include operation 1004 depicting acquiring a service for sorting photographs on a device, said service for sorting photographs generated at least partly based on anonymized data indicating a presence of one or more devices having more than five hundred unsorted pictures stored in memory. For example, FIG. 5, e.g., FIG. 5A, shows entity-obtained device based service for sorting device photographs, said service at least partly based on anonymized data indicating a presence of a particular number of device photographs acquiring module 504 acquiring a service for sorting photographs on a device, said service for sorting photographs generated at least partly based on anonymized data indicating a presence of one or more devices having more than five hundred unsorted pictures stored in memory (e.g., the anonymized data may be a number of devices that have more than five hundred unsorted pictures, or may simply be an indicator that the number of devices that have more than five hundred unsorted pictures is above a threshold number, which may have been set by the service provider). For example, in an embodiment, the service provider may ask if there are more than 100 devices having more than five hundred unsorted pictures stored in memory, and the anonymized data may include merely a "yes" or a "no," based on the service provider request.

Referring again to FIG. 10A, operation 1002 may include operation 1006 depicting acquiring a service for sorting photographs on a device, said service for sorting photographs generated at least partly based on anonymized data indicating that more than thirty-five camera devices of the one or more devices were detected. For example, FIG. 5, e.g., FIG. 5A, shows entity-obtained device based service for sorting device photographs, said service at least partly based on anonymized data indicating a presence of a particular number of devices equipped with a camera acquiring module 506 acquiring a service for sorting photographs on a device, said service for sorting photographs generated at least partly based on anonymized data indicating that more than thirty-five camera devices of the one or more devices were detected.

Referring again to FIG. 10A, operation 608 may include operation 1008 depicting receiving the generated one or more services from the one or more service providers, said generated services at least partly based on the anonymous data. For example, FIG. 5, e.g., FIG. 5A, shows one or more entity-obtained device based services at least partly based on anonymized data receiving module 508 receiving the generated one or more services (e.g., the generated picture sorting service) from the one or more service providers, said generated services at least partly based on the anonymous data (e.g., the picture sorting service is designed to handle large numbers of pictures, based on the anonymous data indirectly indicating that there would be a demand for that type of service).

Referring now to FIG. 10B, operation 608 may include operation 1010 depicting polling one or more service providers to determine a presence of generated one or more services. For example, FIG. 5, e.g., FIG. 5B, shows determining whether one or more services are present by polling one or more entities configured to provide one or more device-based services module 510 polling one or more service providers to determine a presence of generated one or more services (e.g., there may be multiple service providers that put out numerous services, and in an embodiment, rather than notifying each time the one or more service providers generate a service, they are polled for the services they have generated).

Referring again to FIG. 10B, operation 608 may include operation 1012 depicting acquiring at least one of the generated one or more services from the polled one or more service providers. For example, FIG. 5, e.g., FIG. 5B, shows determined one or more services acquiring from the polled one or more entities module 512 acquiring at least one of the generated one or more services (e.g., a rest stop finding service) from the polled one or more service providers.

Referring again to FIG. 10B, operation 1012 may include operation 1014 depicting acquiring at least one of the generated one or more services from the polled one or more service providers, at least partly based on a portion of the one or more devices to which the one or more services require access. For example, FIG. 5, e.g., FIG. 5B, shows determined one or more services acquiring from the polled one or more entities, at least partly based on one or more device features related to the one or more device-based services module 514 acquiring at least one of the generated one or more services from the polled one or more service providers, at least partly based on a portion of the one or more devices (e.g., a portion of the storage medium where music is stored) to which the one or more services (e.g., a new music finding service) require access.

Referring again to FIG. 10B, operation 1014 may include operation 1016 depicting acquiring at least one of the generated one or more services from the polled one or more service providers, at least partly based on the one or more services requiring access to a portion of the one or more devices to which access is indicated as valuable. For example, FIG. 5, e.g., FIG. 5B, shows determined one or more services acquiring from the polled one or more entities, at least partly based on one or more device portions deemed valuable to which the one or more device-based services require access module 516 acquiring at least one of the generated one or more services from the polled one or more service providers, at least partly based on the one or more services requiring access to a portion (e.g., a web browsing history) of the one or more devices to which access is indicated as valuable (e.g., an entity, whether human or automated, has indicated that, for a specific set of devices, or generally, that a web browsing history is valuable information to one or more entities).

Referring again to FIG. 10B, operation 1016 may include operation 1018 depicting acquiring at least one of the generated one or more services from the polled one or more service providers, at least partly based on the one or more services requiring access to a positioning sensor of the one or more devices, wherein the positioning information from the positioning sensor of the one or more devices is indicated as valuable information. For example, FIG. 5, e.g., FIG. 5B, shows determined one or more services acquiring from the polled one or more entities, at least partly based on one or more device portions indicating information regarding a position of the device that is deemed valuable, to which the one or more device-based services require access module 518 acquiring at least one of the generated one or more services (e.g., a soda pop vending machine locating service) from the polled one or more service providers (e.g., a soda pop company, e.g., Coca-Cola), at least partly based on the one or more services requiring access to a positioning sensor (e.g., the vending machine locating service needs the device's current location to show soda pop machines in the device's vicinity) of the one or more devices (e.g., one or more smartphones), wherein the positioning information from the positioning sensor of the one or more devices is indicated as valuable information (e.g., an entity, not necessarily Coca-Cola, has indicated that the position information will be valuable).

Referring again to FIG. 10B, operation 1018 may include operation 1020 depicting acquiring at least one of the generated one or more services from the polled one or more service providers, at least partly based on the one or more services requiring access to a positioning sensor of the one or more devices, wherein the positioning information from the positioning sensor of the one or more devices is indicated as valuable information for use in providing targeted advertising. For example, FIG. 5, e.g., FIG. 5B, shows determined one or more services acquiring from the polled one or more entities, at least partly based on one or more device portions indicating information regarding a position of the device that is deemed valuable for a purpose of targeted advertising, to which the one or more device-based services require access module 520 acquiring at least one of the generated one or more services from the polled one or more service providers, at least partly based on the one or more services requiring access to a positioning sensor of the one or more devices, wherein the positioning information from the positioning sensor of the one or more devices is indicated as valuable information for use in providing targeted advertising.

Referring now to FIG. 10C, operation 608 may include operation 1022 depicting receiving the generated one or more services, said generated services at least partly based on the anonymized data. For example, FIG. 5, e.g., FIG. 5C, shows one or more entity-obtained device based services at least partly based on anonymized data receiving module 522 receiving (e.g., receiving permission to mediate a purchase of the service from a device, regardless of whether the service is acquired) the generated one or more services (e.g., a new music finding service), said generated services at least partly based on the anonymized data (e.g., a list of the songs stored on the device (e.g., a Microsoft Zune HD music player)).

Referring again to FIG. 10C, operation 608 may include operation 1024 depicting selecting a particular service of the generated one or more services. For example, FIG. 5, e.g., FIG. 5C, shows received one or more entity-obtained device based services at least partly based on anonymized data selecting module 524 selecting a particular service (e.g., a pickup football game scheduler that compares friends' locations and schedules) of the generated one or more services.

Referring again to FIG. 10C, operation 1024 may include operation 1026 depicting selecting a particular service of the generated one or more services at least partly based on an analysis of data from the one or more devices that may be obtained if the one or more devices accept the particular services. For example, FIG. 5, e.g., FIG. 5C, shows received one or more entity-obtained device based services at least partly based on anonymized data selecting at least partly based on analysis of anonymized data module 526 selecting a particular service (e.g., a bicycle-riding mapping application) of the generated one or more services at least partly based on an analysis of data (e.g., estimating how much the data might be worth, which might vary depending on the usage of the data, whether it's for sale, for providing more targeted services, or for providing unrelated advertisements and offers) from the one or more devices (e.g., one or more smartphones) that may be obtained if the one or more devices accept the particular services (e.g., the bicycle-riding mapping application).

Referring again to FIG. 10C, operation 1026 may include operation 1028 depicting selecting a user preference learning service that is at least partly based on a web browsing history of a device, based on an analysis that web browsing history of a device may be obtained if the one or more devices accept the user preference learning service. For example, FIG. 5, e.g., FIG. 5C, shows received one or more entity-obtained device based services at least partly based on anonymized data selecting at least partly based on analysis of anonymized data indicating that web browsing history associated with a particular device may be obtained module 528 selecting a user preference learning service that is at least partly based on a web browsing history of a device, based on an analysis that web browsing history of a device may be obtained if the one or more devices accept the user preference learning service (e.g., the web browsing history may be desirable to the entity making the determination, for various reasons, e.g., including, but not limited to, marketing, resale of the data, and analysis of a user's internet behavior for scientific research).

Referring again to FIG. 10C, operation 608 may include operation 1030 depicting receiving information regarding a particular service of the one or more generated services from a particular service provider of the one or more service providers. For example, FIG. 5, e.g., FIG. 5C, shows one or more entity-obtained device based services at least partly based on anonymized data information regarding the service acquiring module 530 receiving information (e.g., a name and profile information, as well as a listing of data required for the application to function properly) regarding a particular service (e.g., a research station weather status tracking application) of the one or more generated services from a particular service provider (e.g., a local university with a weather research division) of the one or more service providers).

Referring again to FIG. 10C, operation 608 may include operation 1032 depicting offering deanonymizing data configured to uniquely identify the one or more devices on which the anonymized data is based, in exchange for receiving the particular service. For example, FIG. 5, e.g., FIG. 5C, shows deanonymization data configured to uniquely identify one or more devices offering in exchange for receiving the particular one or more entity-obtained device based services for which information was acquired module 532 offering deanonymizing data (e.g., data that will convert the anonymized data into or replace the anonymized data with data that uniquely identifies the one or more devices and/or one or more users of the devices) configured to uniquely identify the one or more devices (e.g., a unique device ID) on which the anonymized data is based (e.g., at least one of the one or more devices that generated the data that resulted in the anonymized data), in exchange for receiving the particular service (e.g., a "find new fun places" service for travelers).

Figure 10D:
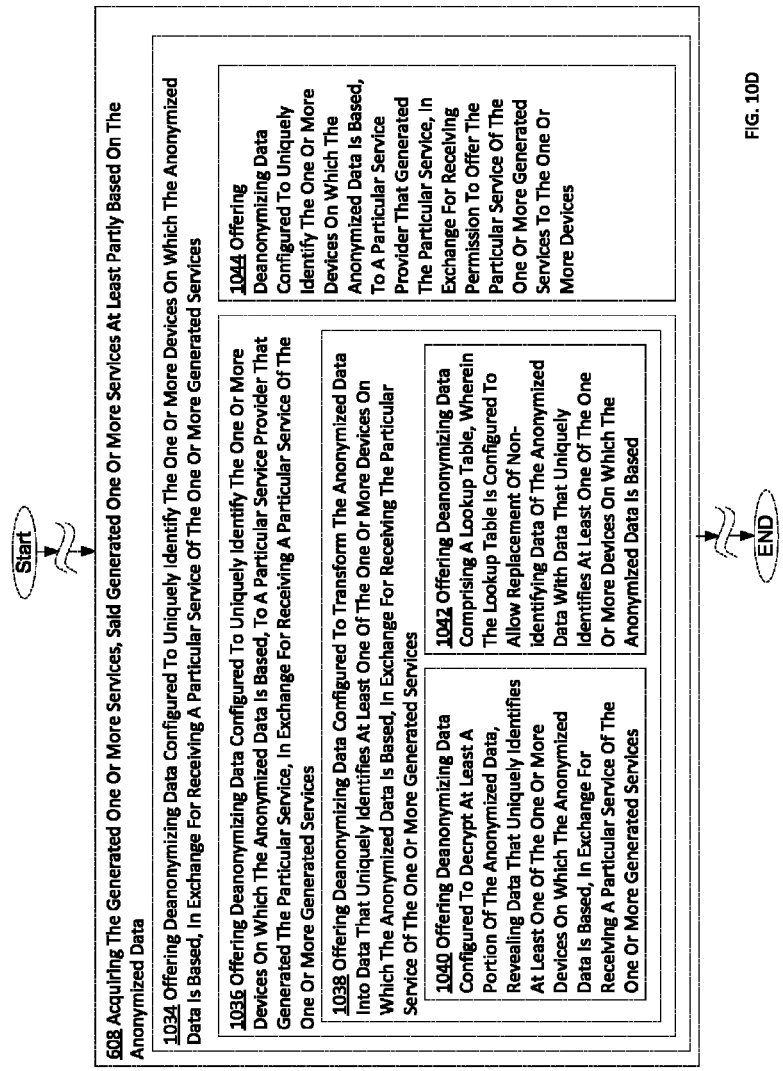
FIG. 10D is a high-level logic flow chart of a process depicting alternate implementations of an acquiring the generated one or more services operation 608, according to one or more embodiments.

Referring now to FIG. 10D, operation 608 may include operation 1034 depicting offering deanonymizing data configured to uniquely identify the one or more devices on which the anonymized data is based, in exchange for receiving a particular service of the one or more generated services. For example, FIG. 5, e.g., FIG. 5D, shows one or more entity-obtained device based services at least partly based on anonymized data acquiring by offering deanonymization data configured to uniquely identify the device module 534 offering deanonymizing data configured to uniquely identify the one or more devices on which the anonymized data is based, in exchange for receiving a particular service (e.g., an optimal workout designing service) of the one or more generated services.

Referring again to FIG. 10D, operation 1034 may include operation 1036 depicting offering deanonymizing data configured to uniquely identify the one or more devices on which the anonymized data is based, to a particular service provider that generated the particular service, in exchange for receiving a particular service of the one or more generated services. For example, FIG. 5, e.g., FIG. 5D, shows one or more entity-obtained device based services at least partly based on anonymized data acquiring by offering deanonymization data to a particular entity that generated a particular service, said deanonymization data configured to uniquely identify the device module 536 offering deanonymizing data (e.g., data that replaces the anonymized data with data that uniquely identifies the one or more devices and/or one or more users of the devices) configured to uniquely identify the one or more devices on which the anonymized data is based, to a particular service provider that generated the particular service, in exchange for receiving a particular service (e.g., an application that plans stops and sights and bathroom breaks on a road trip) of the one or more generated services.

Referring again to FIG. 10D, operation 1036 may include operation 1038 depicting offering deanonymizing data configured to transform the anonymized data into data that uniquely identifies at least one of the one or more devices on which the anonymized data is based, in exchange for receiving the particular service of the one or more generated services. For example, FIG. 5, e.g., FIG. 5D, shows one or more entity-obtained device based services at least partly based on anonymized data acquiring by offering deanonymization data to a particular entity that generated a particular service, said deanonymization data configured to transform the anonymized data into data uniquely identifying the device module 538 offering deanonymizing data (e.g., data that will convert the anonymized data into or replace the anonymized data with data that uniquely identifies the one or more devices and/or one or more users of the devices) configured to transform the anonymized data into data that uniquely identifies at least one of the one or more devices on which the anonymized data is based, in exchange for receiving the particular service (e.g., a common web page caching and updating service for offline and/or faster reading) of the one or more generated services Referring again to FIG. 10D, operation 1038 may include operation 1040 depicting offering deanonymizing data configured to decrypt at least a portion of the anonymized data, revealing data that uniquely identifies at least one of the one or more devices on which the anonymized data is based, in exchange for receiving a particular service of the one or more generated services. For example, FIG. 5, e.g., FIG. 5D, shows one or more entity-obtained device based services at least partly based on anonymized data acquiring by offering deanonymization data to a particular entity that generated a particular service, said deanonymization data configured to decrypt the anonymized data into data uniquely identifying the device module 540 offering deanonymizing data (e.g., data that will convert the anonymized data into data that uniquely identifies the one or more devices and/or one or more users of the devices) configured to decrypt at least a portion of the anonymized data, revealing data that uniquely identifies at least one of the one or more devices (e.g., gaming systems) on which the anonymized data (e.g., number of hours each game of the gaming system is played), in exchange for receiving a particular service (e.g., a new shooting game recommending service) of the one or more generated services (e.g., the one or more generated services included a new shooting game recommending service, a new sports game recommending service, and a new strategy game recommending service, and based on the anonymized data indicating how much time the user spent playing each type of game, the new shooting game recommending service was selected).

Referring again to FIG. 10D, operation 1038 may include operation 1042 depicting offering deanonymizing data including a lookup table, wherein the lookup table is configured to allow replacement of non-identifying data of the anonymized data with data that uniquely identifies at least one of the one or more devices on which the anonymized data is based. For example, FIG. 5, e.g., FIG. 5D, shows one or more entity-obtained device based services at least partly based on anonymized data acquiring by offering deanonymization data to a particular entity that generated a particular service, said deanonymization data configured to substituting the anonymized data for data uniquely identifying the device module 542 offering deanonymizing data (e.g., data that will convert the anonymized data into data that uniquely identifies the one or more devices and/or one or more users of the devices) comprising a lookup table, wherein the lookup table is configured to allow replacement of non-identifying data of the anonymized data (e.g., character strings that were substituted for the IP addresses when the data was originally anonymized) with data that uniquely identifies at least one of the one or more devices (e.g., an IP address) on which the anonymized data is based (e.g., the device that generated the anonymized data).

Referring again to FIG. 10D, operation 1034 may include operation 1044 depicting offering deanonymizing data configured to uniquely identify the one or more devices on which the anonymized data is based, to a particular service provider that generated the particular service, in exchange for receiving permission to offer the particular service of the one or more generated services to the one or more devices. For example, FIG. 5, e.g., FIG. 5D, shows permission to offer one or more entity-obtained device based services at least partly based on anonymized data acquiring by offering deanonymization data configured to uniquely identify the device module 544 offering deanonymized data (e.g., data that will convert the anonymized data into or replace the anonymized data with data that uniquely identifies the one or more devices and/or one or more users of the devices) configured to uniquely identify devices on which the anonymized data is based, to a particular service provider (e.g., a game company that generates gaming services) that generated the particular service, in exchange for receiving permission to offer the particular service of the one or more generated services to the one or more devices (e.g., permission to offer the game service to the gaming system, e.g., to a user of the gaming system).

Figure 10E:
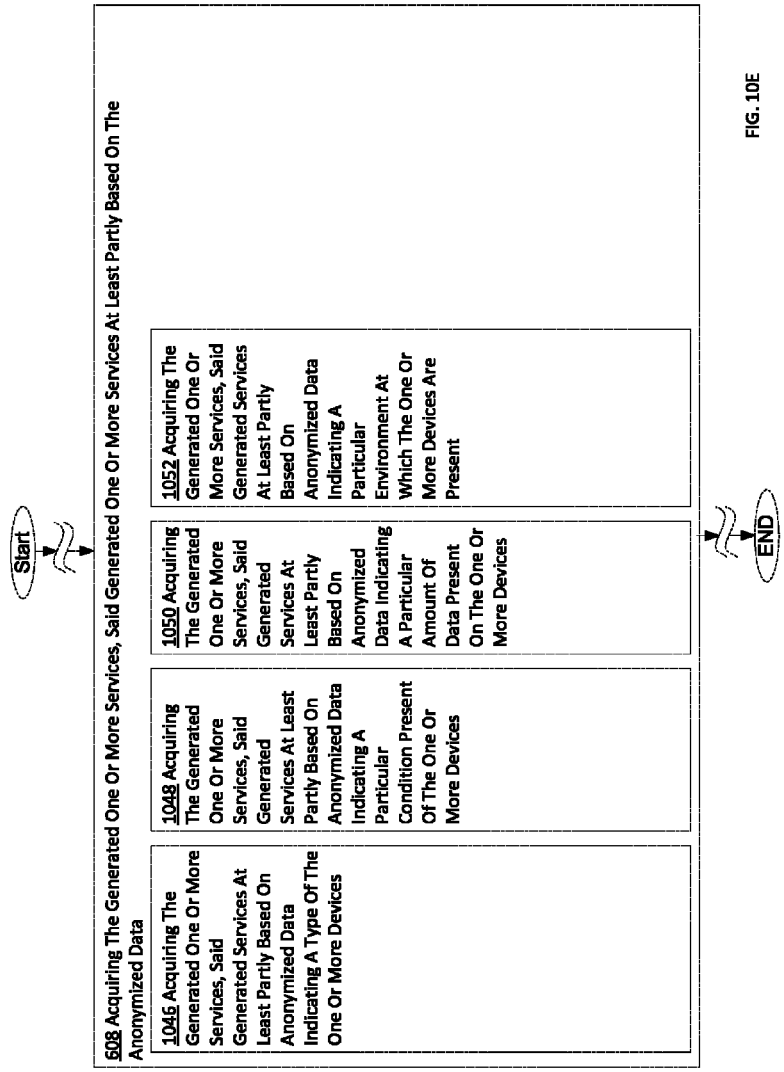
FIG. 10E is a high-level logic flow chart of a process depicting alternate implementations of an acquiring the generated one or more services operation 608, according to one or more embodiments.

Referring now to FIG. 10E, operation 608 may include operation 1046 depicting acquiring the generated one or more services, said generated services at least partly based on anonymized data indicating a type of the one or more devices. For example, FIG. 5, e.g., FIG. 5E, shows one or more entity-obtained device based services at least partly based on anonymized data indicating a type of the device acquiring module 546 acquiring the generated one or more services (e.g., tracking an employee's use of their time in order to boost efficiency), said generated services at least partly based on anonymized data indicating a type (e.g., networked corporate company-owned computers, laptops, and tablet devices) of the one or more devices.

Referring again to FIG. 10E, operation 608 may include operation 1048 depicting acquiring the generated one or more services, said generated services at least partly based on anonymized data indicating a particular condition present of the one or more devices. For example, FIG. 5, e.g., FIG. 5E, shows one or more entity-obtained device based services at least partly based on anonymized data indicating a condition present on the device acquiring module 548 acquiring the generated one or more services (e.g., a driving tips generating service), said generated services at least partly based on anonymized data (e.g., data collected from an in-vehicle navigation and control system, for which the vehicle VIN has been obscured) indicating a particular condition present of the one or more devices (e.g., the in-vehicle navigation and control system).

Referring again to FIG. 10E, operation 608 may include operation 1050 depicting acquiring the generated one or more services, said generated one or more services at least partly based on anonymized data indicating a particular amount of data present on the one or more devices. For example, FIG. 5, e.g., FIG. 5E, shows one or more entity-obtained device based services at least partly based on anonymized data indicating a particular amount of data stored on the device acquiring module 550 acquiring the generated one or more services (e.g., a new music finding service), said generated one or more services at least partly based on anonymized data (e.g., data that does not particularly identify the device, e.g., data for a portable music player for which the user's unique account name has been deleted) indicating a particular amount of data (e.g., more than 5 GB of music encoded in MP3 format) present on the one or more devices (e.g., a portable media player).

Referring again to FIG. 10E, operation 608 may include operation 1052 depicting acquiring the generated one or more services, said generated services at least partly based on anonymized data indicating a particular environment at which the one or more devices are present. For example, FIG. 5, e.g., FIG. 5E, shows one or more entity-obtained device based services at least partly based on anonymized data indicating a particular environment surrounding the device acquiring module 552 acquiring the generated one or more services (e.g., an ice cream parlor finding service), said generated services at least partly based on anonymized data (e.g., data for which the device and/or the user related to the data cannot be uniquely identified) indicating a particular environment (e.g., temperature data indicating an ambient temperature of above thirty degrees Celsius) at which the one or more devices are present.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method of obscuring property data of devices to allow service providers to generate one or more services prior to receiving the property data, said method comprising:
    acquiring property data regarding at least one property of one or more devices;
    generating anonymized data by altering the acquired property data to obscure one or more portions of the acquired property data that uniquely identify the one or more devices and/or one or more users of the one or more devices;

presenting the anonymized data to one or more service providers configured to generate one or more services; and acquiring the generated one or more services, said generated one or more services at least partly based on the anonymized data, said acquiring the generated one or more services including:

offering deanonymizing data that includes a lookup table, wherein the lookup table is configured to allow replacement of non-identifying data of the anonymized data with data that uniquely identifies at least one of the one or more devices on which the anonymized data is based, to a particular service provider that generated the particular service, in exchange for receiving a particular service of the one or more generated services.

2. The computationally-implemented method of claim 1, wherein said acquiring property data regarding at least one property of one or more devices comprises:

receiving property data regarding at least one property of one or more devices.

3. The computationally-implemented method of claim 2, wherein said receiving property data regarding at least one property of one or more devices comprises:

receiving, from a social networking site used by the one or more devices, property data regarding at least one property of the one or more devices.

4. The computationally-implemented method of claim 1, wherein said acquiring property data regarding at least one property of one or more devices comprises:

monitoring data traffic of the one or more devices; and
gathering property data regarding at least one property of the one or more devices from the monitored data traffic.

5. The computationally-implemented method of claim 1, wherein said acquiring property data regarding at least one property of one or more devices comprises:

acquiring property data regarding a presence of one or more sensors on one or more devices.

6. The computationally-implemented method of claim 1, wherein said acquiring property data regarding at least one property of one or more devices comprises:

acquiring property data regarding how many devices of a set of devices meet a particular criterion.

7. The computationally-implemented method of claim 1, wherein said generating anonymized data by altering the acquired property data to obscure one or more portions of the acquired property data that uniquely identify the one or more devices and/or one or more users of the one or more devices comprises:

generating anonymized data by altering the acquired property data, which includes one or more contact lists of one or more devices and one or more device identifiers for the one or more devices, to obscure the device identifiers that uniquely identify the one or more devices.

8. The computationally-implemented method of claim 7, wherein said generating anonymized data by altering the acquired property data, which includes one or more contact lists of one or more devices and one or more device identifiers for the one or more devices, to obscure the device identifiers that uniquely identify the one or more devices comprises:

generating anonymized data by altering the acquired property data, which includes one or more contact lists of one or more devices and one or more device identifiers for the one or more devices, to obscure the device identifiers by replacing the first character of the one or more device identifiers with a character from a lookup table, to obscure the device identifiers that uniquely identify the one or more devices.

9. The computationally-implemented method of claim 1, wherein said generating anonymized data by altering the acquired property data to obscure one or more portions of the acquired property data that uniquely identify the one or more devices and/or one or more users of the one or more devices comprises:

generating anonymized data by altering the acquired property data to obscure one or more portions of the acquired property data that uniquely identify the one or more devices.

10. The computationally-implemented method of claim 1, wherein said generating anonymized data by altering the acquired property data to obscure one or more portions of the acquired property data that uniquely identify the one or more devices and/or one or more users of the one or more devices comprises:

generating anonymized data by altering the acquired property data to obscure one or more portions of the acquired property data that uniquely identify the users of the one or more devices.

11. The computationally-implemented method of claim 1, wherein said generating anonymized data by altering the acquired property data to obscure one or more portions of the acquired property data that uniquely identify the one or more devices and/or one or more users of the one or more devices comprises:

generating anonymized data by altering the acquired property data to remove one or more portions of the acquired property data that uniquely identify the one or more devices and/or users of the one or more devices.

12. The computationally-implemented method of claim 1, wherein said generating anonymized data by altering the acquired property data to obscure one or more portions of the acquired property data that uniquely identify the one or more devices and/or one or more users of the one or more devices comprises:

generating anonymized data by aggregating the acquired property data to obscure a portion of the acquired property data that uniquely identifies the one or more devices and/or users of the one or more devices.

13. The computationally-implemented method of claim 1, wherein said generating anonymized data by altering the acquired property data to obscure one or more portions of the acquired property data that uniquely identify the one or more devices and/or one or more users of the one or more devices comprises:

generating anonymized data by removing a link between the acquired property data and a unique identification of the one or more devices that generated the acquired property data.

14. The computationally-implemented method of claim 1, wherein said generating anonymized data by altering the acquired property data to obscure one or more portions of the acquired property data that uniquely identify the one or more devices and/or one or more users of the one or more devices comprises:

generating anonymized data by adding the acquired property data to previously acquired property data and removing data indicating the relationship between the one or more devices and one or more specific portions of the property data that uniquely identify the one or more devices.

15. The computationally-implemented method of claim 1, wherein said generating anonymized data by altering the acquired property data to obscure one or more portions of the acquired property data that uniquely identify the one or more devices and/or one or more users of the one or more devices comprises:
generating anonymized data by altering the acquired property data to encrypt one or more portions of the acquired property data that uniquely identify the one or more devices and/or users of the one or more devices.

16. The computationally-implemented method of claim 1, wherein said generating anonymized data by altering the acquired property data to obscure one or more portions of the acquired property data that uniquely identify the one or more devices and/or one or more users of the one or more devices comprises:
generating anonymized data by altering the acquired property data by applying a reversible data transformation algorithm to one or more portions of the acquired property data that uniquely identify the one or more devices and/or users of the one or more devices.

17. The computationally-implemented method of claim 1, wherein said generating anonymized data by altering the acquired property data to obscure one or more portions of the acquired property data that uniquely identify the one or more devices and/or one or more users of the one or more devices comprises:
generating anonymized data by altering the acquired property data by replacing one or more portions of the acquired property data that uniquely identify the one or more devices and/or users of the one or more devices with data having a similar format as uniquely identifying data that uniquely identifies the one or more devices and/or users.

18. The computationally-implemented method of claim 1, wherein said presenting the anonymized data to one or more service providers configured to generate one or more services comprises:
transmitting the anonymized data to one or more service providers configured to generate one or more services.

19. The computationally-implemented method of claim 1, wherein said presenting the anonymized data to one or more service providers configured to generate one or more services comprises:
presenting a visual exchange interface configured to be accessed by the one or more service providers, wherein the visual exchange interface is configured to allow the one or more service providers to view a representation of the anonymized data.

20. The computationally-implemented method of claim 19, wherein said presenting a visual exchange interface configured to be accessed by the one or more service providers, wherein the visual exchange interface is configured to allow the one or more service providers to view a representation of the anonymized data comprises:
presenting a visual exchange interface configured to be accessed by the one or more service providers, wherein the visual exchange interface comprises one or more graphical representations of the anonymized data.

21. The computationally-implemented method of claim 1, wherein said presenting the anonymized data to one or more service providers configured to generate one or more services comprises:
presenting the anonymized data to an auction-style interface configured to allow the one or more service providers to place one or more bids for access to the anonymized data.

22. The computationally-implemented method of claim 1, wherein said presenting the anonymized data to one or more service providers configured to generate one or more services comprises:
receiving a request from a service provider for particular anonymized data;
determining whether the generated anonymized data is configured to fulfill the requested particular anonymized data; and
transmitting the generated anonymized data based on the determination regarding the generated anonymized data.

23. The computationally-implemented method of claim 1, wherein said presenting the anonymized data to one or more service providers configured to generate one or more services comprises:
presenting the anonymized data to one or more service providers configured to generate the one or more services, wherein said one or more service providers have previously registered to receive presentations of various anonymous data.

24. The computationally-implemented method of claim 23, wherein said presenting the anonymized data to one or more service providers configured to generate the one or more services, wherein said one or more service providers have previously registered to receive presentations of various anonymous data comprises:
presenting the anonymized data to one or more service providers configured to generate the one or more services, wherein said one or more service providers have previously registered to receive presentations of various anonymous data that has a property in common with the generated anonymized data.

25. The computationally-implemented method of claim 1, wherein said presenting the anonymized data to one or more service providers configured to generate one or more services comprises:
receiving a request from one or more service providers to receive the anonymized data; and
selecting one or more service providers to which the anonymized data is configured to be presented.

26. The computationally-implemented method of claim 1, wherein said presenting the anonymized data to one or more service providers configured to generate one or more services comprises:
transmitting a portion of the anonymized data to one or more service providers configured to generate one or more services; and
transmitting a remainder of the anonymized data to the one or more services upon receipt of an indication that the one or more service providers request the remainder of the anonymized data.

27. The computationally-implemented method of claim 1, wherein said acquiring the generated one or more services, said generated one or more services at least partly based on the anonymized data comprises:
receiving the generated one or more services from the one or more service providers, said generated services at least partly based on the anonymous data.

28. The computationally-implemented method of claim 1, wherein said acquiring the generated one or more services, said generated one or more services at least partly based on the anonymized data comprises:
polling one or more service providers to determine a presence of generated one or more services; and
acquiring at least one of the generated one or more services from the polled one or more service providers.

29. The computationally-implemented method of claim 28, wherein said acquiring at least one of the generated one or more services from the polled one or more service providers comprises:
acquiring at least one of the generated one or more services from the polled one or more service providers, at least partly based on a portion of the one or more devices to which the one or more services require access.

30. The computationally-implemented method of claim 29, wherein said acquiring at least one of the generated one or more services from the polled one or more service providers, at least partly based on a portion of the one or more devices to which the one or more services require access comprises:
acquiring at least one of the generated one or more services from the polled one or more service providers, at least partly based on the one or more services requiring access to a portion of the one or more devices to which access is indicated as valuable.

31. The computationally-implemented method of claim 1, wherein said acquiring the generated one or more services, said generated one or more services at least partly based on the anonymized data comprises:
receiving the generated one or more services, said generated services at least partly based on the anonymized data; and
selecting a particular service of the generated one or more services.

32. The computationally-implemented method of claim 31, wherein said selecting a particular service of the generated one or more services comprises:
selecting a particular service of the generated one or more services at least partly based on an analysis of data from the one or more devices that may be obtained if the one or more devices accept the particular services.

33. The computationally-implemented method of claim 31, wherein said selecting a particular service of the generated one or more services comprises:
selecting a particular service of the generated one or more services that is at least partly based on a valuation of data from the one or more devices that is configured to be obtained when the one or more devices accept the particular service.

34. The computationally-implemented method of claim 1, wherein said acquiring the generated one or more services, said generated one or more services at least partly based on the anonymized data comprises:
offering deanonymizing data configured to uniquely identify the one or more devices on which the anonymized data is based, to a particular service provider that generated the particular service, in exchange for receiving permission to offer the particular service of the one or more generated services to the one or more devices.

35. The computationally-implemented method of claim 1, wherein said acquiring the generated one or more services, said generated one or more services at least partly based on the anonymized data comprises:
acquiring the generated one or more services, said generated services at least partly based on anonymized data indicating a type of the one or more devices.

36. The computationally-implemented method of claim 1, wherein said acquiring the generated one or more services, said generated one or more services at least partly based on the anonymized data comprises:
acquiring the generated one or more services, said generated services at least partly based on anonymized data indicating a particular condition present of the one or more devices.

37. A computationally-implemented system, comprising
circuitry for acquiring property data regarding at least one property of one or more devices;
circuitry for generating anonymized data by altering the acquired property data to obscure one or more portions of the acquired property data that uniquely identify the one or more devices and/or one or more users of the one or more devices;
circuitry for presenting the anonymized data to one or more service providers configured to generate one or more services; and
circuitry for acquiring the generated one or more services, said generated one or more services at least partly based on the anonymized data, said circuitry for acquiring the generated one or more services including:
circuitry for offering deanonymization data that includes a lookup table, wherein the lookup table is configured to allow replacement of non-identifying data of the anonymized data with data that uniquely identifies at least one of the one or more devices on which the anonymized data is based, to a particular service provider that generated the particular service, in exchange for receiving a particular service of the one or more generated services.

38. A device defined by a computational language comprising:
one or more interchained physical machines ordered for acquiring property data regarding at least one property of one or more devices;
one or more interchained physical machines ordered for generating anonymized data by altering the acquired property data to obscure one or more portions of the acquired property data that uniquely identify the one or more devices and/or one or more users of the one or more devices;
one or more interchained physical machines ordered for presenting the anonymized data to one or more service providers configured to generate one or more services; and
one or more interchained physical machines ordered for acquiring the generated one or more services, said generated one or more services at least partly based on the anonymized data, said one or more interchained physical machines ordered for acquiring the generated one or more services including:
one or more interchained physical machines ordered for offering deanonymization data that includes a lookup table, wherein the lookup table is configured to allow replacement of non-identifying data of the anonymized data with data that uniquely identifies at least one of the one or more devices on which the anonymized data is based, to a particular service provider that generated the particular service, in exchange for receiving a particular service of the one or more generated services.

39. A device, comprising:
a memory; and
a processor operably coupled to the memory, said processor including:
circuitry for acquiring property data regarding at least one property of one or more devices;
circuitry for generating anonymized data by altering the acquired property data to obscure one or more portions of the acquired property data that uniquely identify the one or more devices and/or one or more users of the one or more devices;

circuitry for presenting the anonymized data to one or more service providers configured to generate one or more services; and circuitry for acquiring the generated one or more services, said generated one or more services at least partly based on the anonymized data, said acquiring the generated one or more services including:

circuitry for offering deanonymizing data that includes a lookup table, wherein the lookup table is configured to allow replacement of non-identifying data of the anonymized data with data that uniquely identifies at least one of the one or more devices on which the anonymized data is based, to a particular service provider that generated the particular service, in exchange for receiving a particular service of the one or more generated services.

* * * * *